United States Patent
Arunkumar et al.

(10) Patent No.: US 12,537,925 B1
(45) Date of Patent: Jan. 27, 2026

(54) AUTOMATICALLY FOCUSING CAMERAS TO COMPENSATE FOR TEMPERATURE OR ORIENTATION CHANGES

(71) Applicant: Amazon Technologies, Inc., Seattle, WA (US)

(72) Inventors: Nithya Arunkumar, Sammamish, WA (US); Abhinav Kashyap, Redmond, WA (US); Shuai Yue, Bellevue, WA (US); Valentina Ferro, Seattle, WA (US); Baomin Wang, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/661,298

(22) Filed: May 10, 2024

(51) Int. Cl.
*H04N 13/207* (2018.01)
*H04N 13/128* (2018.01)
*H04N 13/178* (2018.01)
*H04N 13/246* (2018.01)
*H04N 23/63* (2023.01)
*H04N 13/00* (2018.01)

(52) U.S. Cl.
CPC ........ *H04N 13/207* (2018.05); *H04N 13/128* (2018.05); *H04N 13/178* (2018.05); *H04N 13/246* (2018.05); *H04N 23/635* (2023.01); *H04N 2013/0081* (2013.01); *H04N 2213/001* (2013.01)

(58) Field of Classification Search
CPC .. H04N 13/207; H04N 13/128; H04N 13/178; H04N 13/246; H04N 23/635; H04N 2013/0081; H04N 2213/001
See application file for complete search history.

(56) References Cited

U.S. PATENT DOCUMENTS

| | | | |
|---|---|---|---|
| 3,191,898 A | 6/1965 | Mccullough | |
| 6,864,910 B1 * | 3/2005 | Ogino | H04N 13/211 348/42 |
| 7,225,980 B2 | 6/2007 | Ku et al. | |
| 7,949,568 B2 | 5/2011 | Fano et al. | |
| 8,009,864 B2 | 8/2011 | Linaker et al. | |
| (Continued) | | | |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Hung H Lam
(74) *Attorney, Agent, or Firm* — Athorus, PLLC

(57) ABSTRACT

A camera system is automatically focused based on pixel disparity values calculated by the camera at various times. A lens of a camera is positioned at an initial distance from an imaging sensor of the camera based on an initial digital-to-analog conversion value. Subsequently, pixel disparity values are calculated for each of a plurality of regions of a field of view of the camera. An optimal distance between the lens and the image sensor is calculated based on the pixel disparity values and a fitting constant for the camera, as well as the initial digital-to-analog conversion value, and the lens is repositioned to a distance corresponding to the median. The process may be performed following triggering events, or on a regular basis, and repeated over time.

20 Claims, 17 Drawing Sheets

(56) References Cited

U.S. PATENT DOCUMENTS

| | | | |
|---|---|---|---|
| 8,175,925 B1 | 5/2012 | Rouaix | |
| 8,189,855 B2 | 5/2012 | Opalach et al. | |
| 8,210,368 B2 | 7/2012 | Schwartzkopf et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 8,896,671 B2 | 11/2014 | Jayaram et al. | |
| 8,947,527 B1 | 2/2015 | Postovalov et al. | |
| 9,473,747 B2 | 10/2016 | Kobres et al. | |
| 10,051,958 B2 | 8/2018 | Andersson et al. | |
| 10,282,720 B1 | 5/2019 | Buibas et al. | |
| 10,530,973 B2 | 1/2020 | DePaschoal | |
| 10,656,502 B1 | 5/2020 | Sandoval | |
| 10,909,706 B1 * | 2/2021 | Anneheim | G06T 3/18 |
| 11,012,601 B1 | 5/2021 | Yue et al. | |
| 11,079,064 B1 | 8/2021 | Cifers et al. | |
| 11,113,938 B2 | 9/2021 | Siminoff | |
| 2003/0002712 A1 | 1/2003 | Steenburgh et al. | |
| 2004/0181467 A1 | 9/2004 | Raiyani et al. | |
| 2007/0014347 A1 | 1/2007 | Prechtl et al. | |
| 2007/0024743 A1 | 2/2007 | Hida | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2011/0285826 A1 * | 11/2011 | Bickerstaff | H04N 13/239 348/47 |
| 2012/0242837 A1 | 9/2012 | Sasagawa et al. | |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0279294 A1 | 9/2014 | Field-Darragh et al. | |
| 2014/0362223 A1 | 12/2014 | LaCroix et al. | |
| 2015/0019391 A1 | 1/2015 | Kumar et al. | |
| 2015/0073907 A1 | 3/2015 | Purves et al. | |
| 2015/0162048 A1 | 6/2015 | Hirata et al. | |
| 2016/0042526 A1 * | 2/2016 | Lee | H04N 23/635 348/351 |
| 2017/0017136 A1 * | 1/2017 | Kao | G03B 13/20 |
| 2017/0041535 A1 | 2/2017 | Nguyen et al. | |
| 2017/0178352 A1 | 6/2017 | Harmsen et al. | |
| 2018/0130255 A1 | 5/2018 | Hazeghi et al. | |
| 2018/0332236 A1 | 11/2018 | Glaser et al. | |
| 2018/0356710 A1 | 12/2018 | Bingleman et al. | |
| 2019/0028054 A1 | 1/2019 | Karkheck | |
| 2019/0068868 A1 * | 2/2019 | Lee | H04N 23/6815 |
| 2019/0075233 A1 * | 3/2019 | Galor Gluskin | H04N 25/703 |
| 2019/0081587 A1 | 3/2019 | Mayfield et al. | |
| 2019/0191083 A1 | 6/2019 | Gorloff | |
| 2019/0278078 A1 | 9/2019 | Krishnan et al. | |
| 2020/0084416 A1 | 3/2020 | Inoshita | |
| 2020/0201144 A1 | 6/2020 | Ramones et al. | |
| 2020/0260029 A1 * | 8/2020 | Kang | H04N 17/002 |
| 2021/0067703 A1 * | 3/2021 | Kadambala | H04N 23/71 |
| 2021/0396350 A1 | 12/2021 | Eichinger et al. | |
| 2022/0303445 A1 | 9/2022 | Skaff et al. | |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

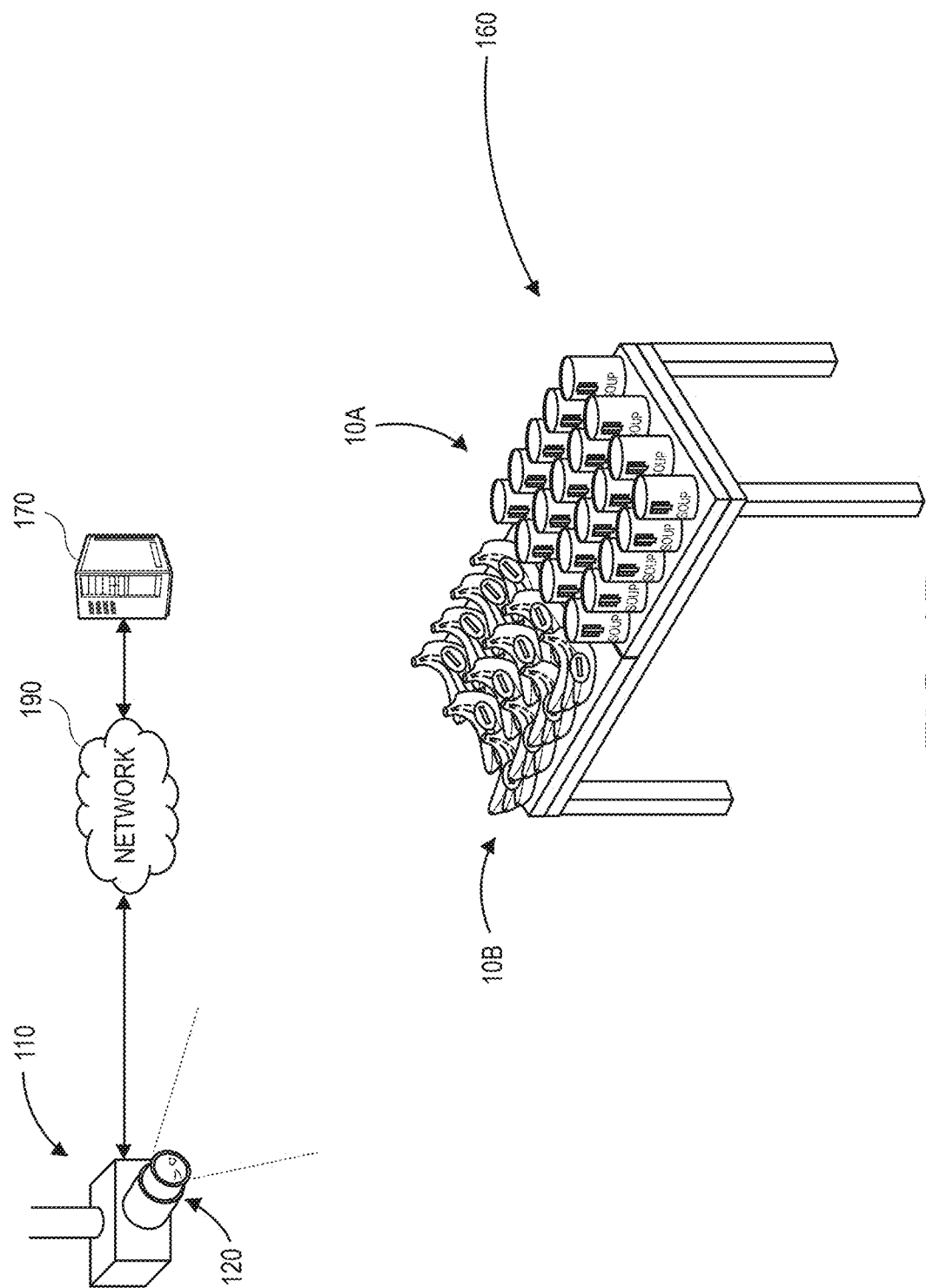

DETERMINE FITTING CONSTANT m FROM PHASE DISPARITIES
AT VARIOUS DISTANCES DEFINED BY DAC INTERVALS

AUTOMATICALLY FOCUSING CAMERAS TO COMPENSATE FOR TEMPERATURE OR ORIENTATION CHANGES

BACKGROUND

Imaging devices, such as cameras, are frequently used in bricks-and-mortar commercial settings. In a materials handling facility, such as a retail store or establishment, a camera may be provided in one or more locations and configured to include portions of the materials handling facility within its field of view. Images captured by the camera may be processed to identify one or more customers or other personnel within the materials handling facility, to detect movements of such customers or personnel, or to identify items that are removed from storage units by such customers or personnel, or placed on such storage units by such customers or personnel.

Cameras that are provided within a materials handling facility are commonly mounted in elevated configurations, e.g., to ceilings or on walls or other systems, so that fields of view of the cameras include accessible floor spaces, storage units or other areas. Locations at which the imaging devices are mounted may be selected in order to ensure that specific areas of the materials handling facility are appropriately covered.

Occasionally, a location that is optimal for mounting a camera to capture images within a materials handling facility is less than optimal for performing maintenance on the camera. For example, mounting a camera to a ceiling or a wall by way of a pole, a stanchion or another extension typically requires one or more workers to use a ladder or scaffolding to join the camera to the ceiling. When the camera requires maintenance or repairs, however, similar efforts to access the camera may be required. Moreover, when a camera is mounted in an elevated location of a materials handling facility, the camera may be particularly susceptible to variations in temperature or other adverse conditions within the materials handling facility, such as elevated levels of heat, vapor, dust, or other airborne material or particulate matter. Exposure to such temperatures or adverse conditions may ultimately impact the proper operation of a camera, or require periodic maintenance to be performed upon the camera, in order to ensure that the camera remains in focus.

BRIEF DESCRIPTION OF THE DRAWINGS

FIGS. 1A through 1G are views of aspects of one system in accordance with implementations of the present disclosure.

DETAILED DESCRIPTION

As is set forth in greater detail below, the present disclosure is directed to automatically focusing cameras. More specifically, the present disclosure is directed to systems including cameras or camera modules with motorized lenses or lens assemblies that may be mounted in any particular location or orientation, or methods to be executed by such cameras or camera modules to maintain the cameras or camera modules in focus, and without manual intervention.

In some implementations, a camera may be configured to determine information regarding disparities in phases to determine whether objects depicted within images captured by the camera are in focus, or are out-of-focus. If such objects are determined to be out-of-focus, the camera may predict a magnitude and a direction by which a lens should be repositioned, e.g., by a motor, such as a servo motor or a voice coil motor, and cause the lens to be rapidly repositioned by the predicted magnitude and in the predicted direction accordingly. Whether objects depicted within images captured by a camera are in focus, or are out-of-focus, may be determined periodically or upon detecting a triggering event, such as a detected shock or an impact to the camera, a change in temperature within a vicinity of the camera, passage of a predetermined period of time, or any other event or circumstance.

The systems and methods of the present disclosure may thus respond to unwanted variations in focal lengths caused by ambient thermal shifts or other environmental factors within a vicinity of the cameras or camera modules, or in response to external shocks to the cameras or camera modules, or other unintended movements, based on feedback determined from the scene. Thus, when a camera or camera module is mounted to a ceiling or a wall, or in another elevated location within a materials handling facility or another facility, the camera may vary a vocal length to automatically refocus itself upon determining that images captured thereby are out-of-focus without requiring any human intervention or effort accordingly.

Figure 1A:
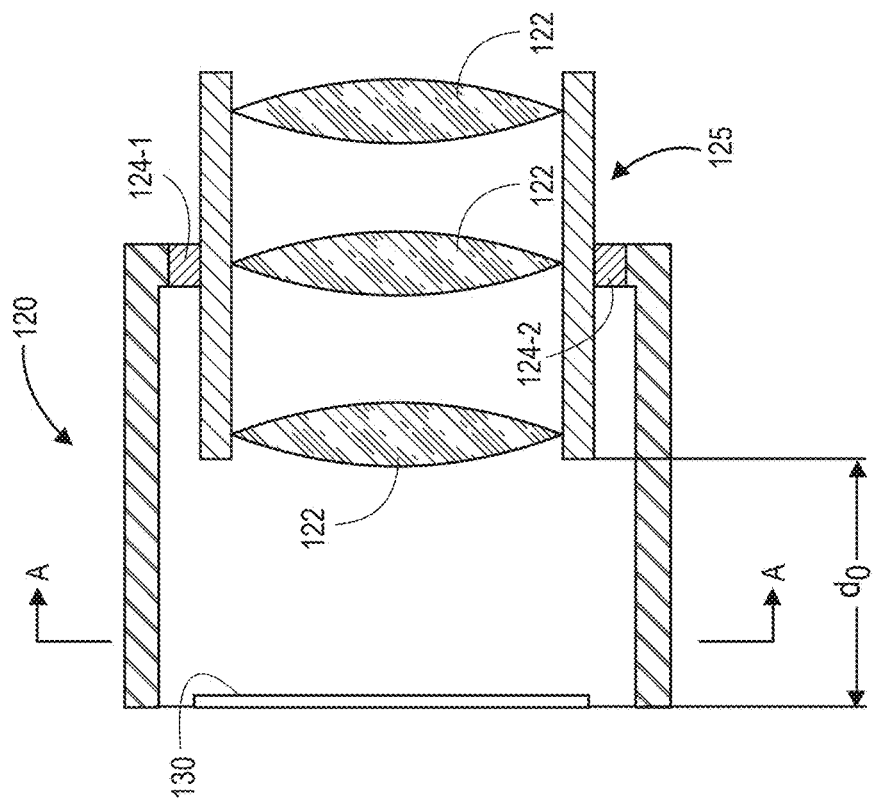
Figure 1A:
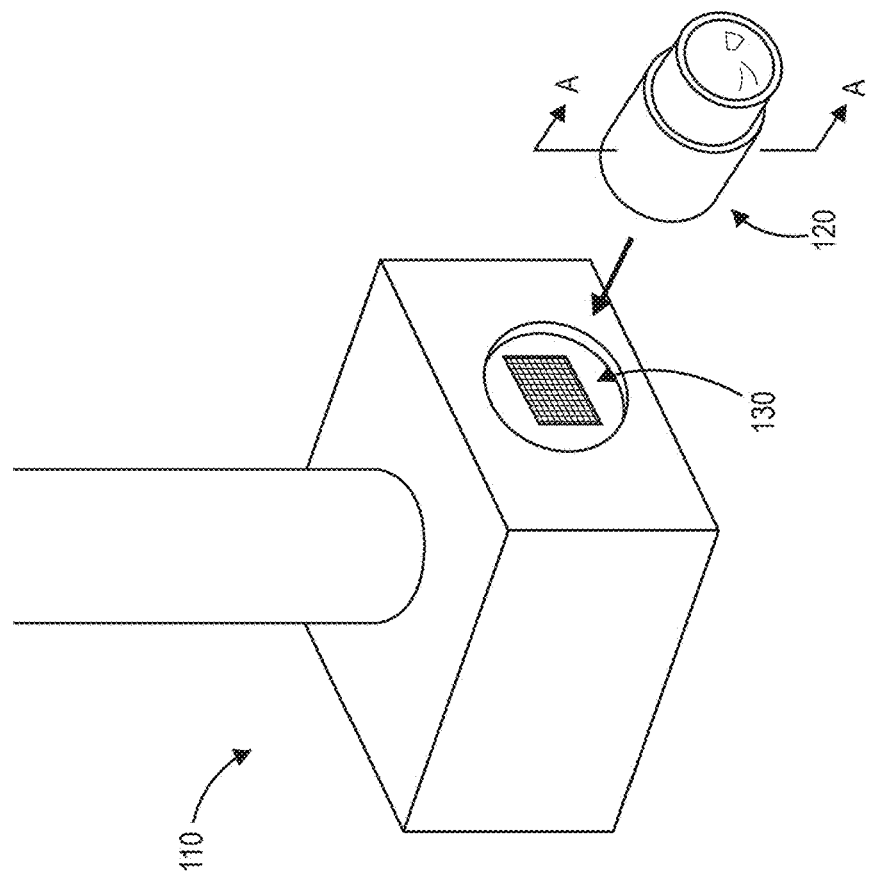

Referring to FIGS. 1A through 1G, views of aspects of one system in accordance with implementations of the present disclosure are shown. As is shown in FIG. 1A, an imaging device 110 (e.g., a camera) includes a lens assembly 120 that may be releasably mounted to a housing or another surface of the imaging device 110, in alignment with an image sensor 130. The imaging device 110 may be any type or form of optical recording device that may be used to photograph or otherwise record imaging data within a materials handling facility or in any other location, and for any purpose. The imaging device 110 may be mounted in any specific location, such as above, below or alongside one or more inventory areas or stations for receiving or distributing items, or in any open or enclosed environment or space in which any number of actors (e.g., humans, other animals or machines) may execute one or more poses, gestures or other actions within one or more of their fields of view.

The lens assembly 120 may include any number of lenses 122 that are coaligned with respect to the optical axis, and define a field of view extending forward of the lens assembly 120. For example, as is shown in FIG. 1A, the lens assembly 120 includes three lenses 122 that are provided in a lens barrel 125, which is a mechanical structure for holding or securing the one or more lenses 122 therein, radially with respect to one another. The lenses 122 are mounted within the lens barrel 125 such that centers of curvature of the lenses 122 fall on a common line, viz., the optical axis. The lens barrel 125 thus enables the imaging device 110 to interact with the lenses 122 during operation.

The lens barrel 125 may be formed from materials that may be particularly selected to minimize axial and radial stresses on the lenses 122, and to avoid strains on such elements during operation. In some implementations, the lens barrel 125 may be formed from a metal such as aluminum, steel, beryllium or titanium, or a non-metallic material such as carbon fiber, and the lenses 122 may be formed from glass or other suitable materials.

The lens assembly 120 further includes at least two motors 124-1, 124-2 (e.g., servos or voice coil motors) that are coupled to the lens barrel 125, or otherwise configured to move or translate the lens barrel 125 and, by extension, the lenses 122 in one or more directions in a direction along or parallel to an optical axis. For example, in some implementations, one of the motors 124-1, 124-2 may be configured to move the lens barrel 125 in a first direction along an optical axis, and another of the motors 124-1, 124-2 may be configured to move the lens barrel 125 in a second direction along the optical axis. Alternatively, or additionally, the lens assembly 120 may include any number of other lenses, including one or more lenses that are stationary with respect to the housing or structure of the lens assembly 120, or with respect to an optical axis.

In some implementations, the motors 124-1, 124-2 may be configured to move the lens barrel 125 along or parallel to the optical axis based on an input current provided to one or more coils or other features of the motors 124-1, 124-2. The input current may be determined based on an input voltage supplied to the motors from a digital-to-analog converter, or on any other basis.

Alternatively, in some implementations, the imaging device 110 need not include the lens barrel 125, and the motors 124-1, 124-2 may be coupled to or otherwise configured to move the lenses 122 in any other manner.

As is further shown in FIG. 1A, a nearest lens 122 of the lens barrel 125 is provided at an initial distance $d_0$ from the sensor 130. The distance $d_0$ may be selected on any basis and for any reason. For example, in some implementations, the distance $d_0$ may be selected in order to cause objects provided at a predetermined range from any of the lenses 122, such as one to two meters, to appear within focus.

The imaging device 110 may include any number of memory or storage components, photosensitive surfaces, filters, chips, electrodes, clocks, boards, timers, power sources, connectors or any other components. In some implementations, the imaging device 110 may have a field of view that overlaps at least in part with another field of view of another camera (not shown) that may be aligned in a different location and at a non-parallel angle or orientation with respect to that camera. In some implementations, the imaging device 110 may be calibrated, and operated along with one or more other imaging devices, such that mappings between coordinates of imaging data captured by the respective imaging devices and directions relative to their respective image sensors are known. Additionally, the imaging device 110 may be installed or otherwise operated independently or with other imaging devices as components of a camera network (or an imaging device network).

The imaging device 110 may be configured to capture visual images (e.g., color, grayscale, or black-and-white images), or any other type or form of imaging data (e.g., depth images). In some implementations, the imaging device 110 may include one or more optical sensors, e.g., the image sensor 130, which may include pixel sensors such as color sensors (or grayscale sensors or black-and-white sensors) and/or depth sensors configured to capture visual imaging data (e.g., textures) or depth imaging data (e.g., ranges) associated with objects within one or more fields of view of the imaging device 110.

In some implementations, the image sensor 130 may include pixel sensors that are configured to capture visual imaging data at relatively high levels of resolution, any number of pixels (e.g., eight to nine megapixels) per image, and at relatively high frame rates, e.g., fifteen or more frames per second (fps). The image sensor 130 may include arrays of pixel sensors, such as photodetectors or photosensitive components, charge coupled devices ("CCD"), complementary metal-oxide sensors ("CMOS"), photodiodes, or the like. Such pixel sensors may capture light scattered or reflected from objects and assign one or more quantitative values (e.g., red, green, blue or other color values, or distances or ranges to such objects) to aspects of the scattered or reflected light. Alternatively, or additionally, in some implementations, the image sensor 130 may be configured to capture any other imaging data, such as depth imaging data, at any levels of resolution or frame rates.

In some implementations, the image sensor 130 may further include a plurality of pixel sensors for determining phase disparities of a field of view of the imaging device 110. The pixel sensors for determining phase disparities are embedded with other pixel sensors, e.g., visual pixel sensors or depth pixel sensors. For example, the image sensor 130 may include left phase disparity pixel sensors and right disparity pixel sensors within an active pixel area, in any concentration or density. In some implementations, the image sensor 130 may include pairs of left phase disparity pixel sensors and right phase disparity pixel sensors distributed within an array of visual pixel sensors, such as four pairs of left phase disparity pixel sensors and right phase disparity pixel sensors within a square array of eight pixel sensors by eight pixel sensors in size, or four pairs of left phase disparity pixel sensors and right phase disparity pixel sensors within a square array of sixteen pixel sensors by sixteen pixel sensors in size.

Thus, where the image sensor 130 includes visual pixel sensors or depth pixel sensors along with phase disparity pixel sensors distributed within an array, the imaging device 110 may capture frames of imaging data and calculate phase disparities associated with each of such frames. Alternatively, the image sensor 130 may be configured to capture frames of imaging data and to calculate phase disparities independently, or at different times.

In some implementations, the imaging device 110 may also include one or more memory or storage components, processors or transceivers (not shown). Additionally, the imaging device 110 may be configured to capture one or more still or moving images (e.g., streams of visual and/or depth images or image frames), along with any relevant audio signals or other information (e.g., position data), and also to communicate with any other computer devices over one or more networks, through the sending and receiving of digital data.

In some implementations, the imaging device 110 may be self-powered, e.g., by one or more power sources internal to or onboard the imaging device 110, such as batteries or fuel cells. In some other implementations, however, the imaging device 110 may receive alternating current (or "AC") or direct current (or "DC") power from one or more external power sources, e.g., by one or more conductors or other connectors. For example, the imaging device 110 may receive power by a dedicated connection to external devices or systems, or power sources, e.g., according to a Power over Ethernet (or "PoE") or a Universal Serial Bus Type-C ("USB-C") standard or system that may also be utilized to transfer information or data to or from the imaging device 110. Although only a single imaging device 110 is shown in FIG. 1A, the scene may include any number of imaging devices 110, which may have fields of view that may include all or portions of the fixture 160, and two or more of such fields of view may overlap at least in part.

As is shown in FIG. 1B, the imaging device 110 is mounted to capture imaging data from a scene, such as a materials handling facility, a fulfillment center, a warehouse, or any other like facility, that includes a fixture 160 (e.g., a table, a rack or a set of inventory shelves). The imaging device 110 may be connected to a system 170 (e.g., a server) or any other devices, systems or components (not shown) over a network 190, or one or more networks, which may include the Internet in whole or in part. The system 170 may be provided in the same physical location as the imaging device 110, or in one or more alternate or virtual locations, e.g., in a "cloud"-based environment.

The scene may be any open or enclosed environment or space in which any number of actors (e.g., customers, workers or other humans, animals or machines) may execute one or more poses, gestures, movements or other interactions within the field of view of the imaging device 110. The fixture 160 may be a table or any other fixture that includes a plurality of product spaces (e.g., sections or areas having one or more surfaces), which may be portions (e.g., lanes or other predefined sections) of a common platform of the fixture 160 for accommodating sets of items 10A, 10B thereon. Alternatively, or additionally, one or both of the product spaces may occupy a portion or an entirety of the fixture 160.

The imaging device 110 may also be in communication with one or more other devices or systems, e.g., over the network 190. Such other devices or systems may include one or more databases or other data stores having information regarding attributes that are, have been or might be stored on the fixture 160, e.g., the sets of items 10A, 10B, and their respective locations thereon. In some implementations, the attributes may include, but need not be limited to, dimensions and/or masses of the items 10A, 10B, locations on the fixture 160 where the items 10A, 10B are typically placed, colors or textures of surface elements or features (e.g., packaging, wrapping, coverings or the like) of the items 10A, 10B, or any other attributes. In some implementations, the system 170 or the imaging device 110 may be programmed with positions of product spaces where the items 10A, 10B are typically placed on the fixture 160 within a field of view of the imaging device 110.

Figure 1C:
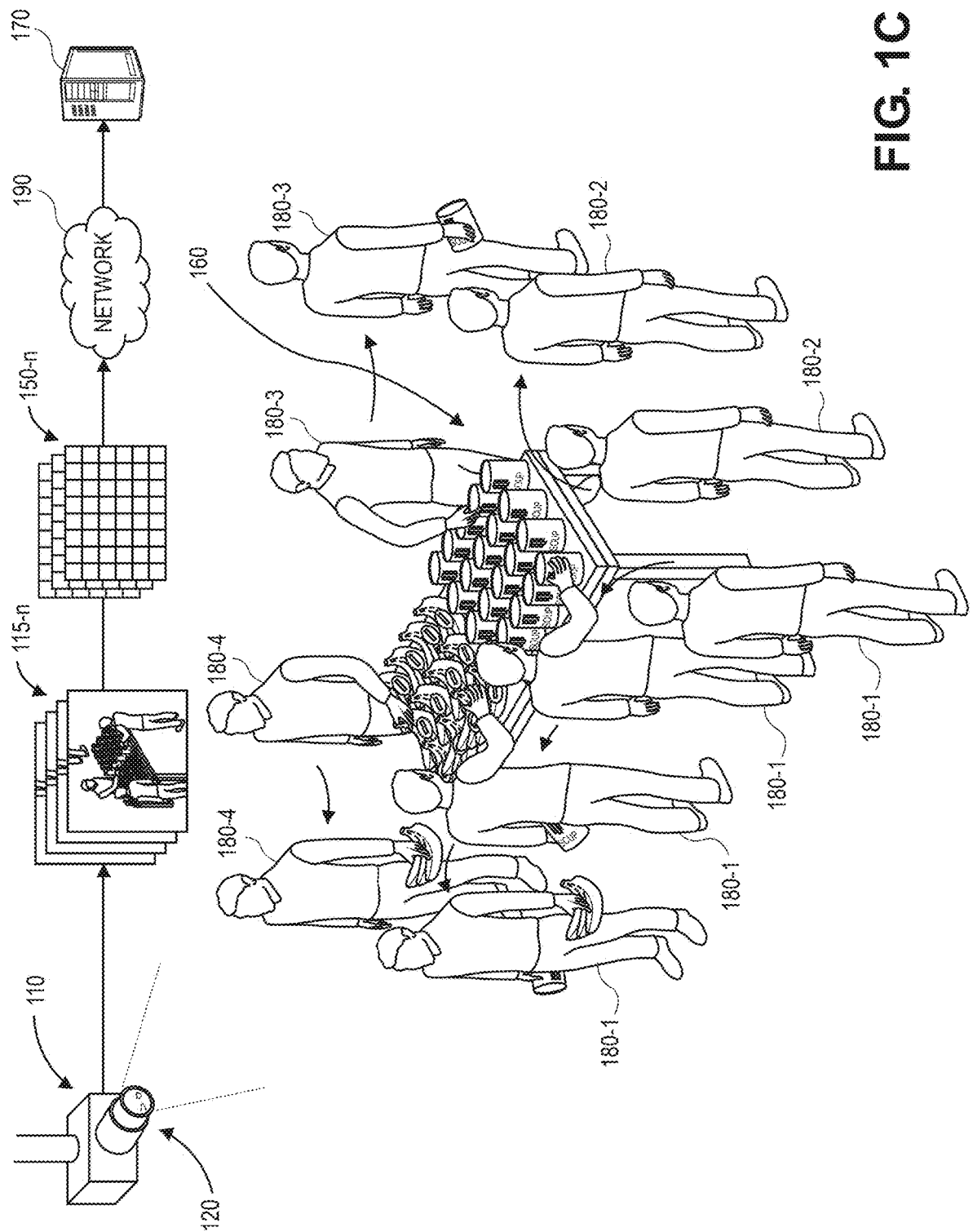

As is shown in FIG. 1C, a plurality of actors 180-1, 180-2, 180-3, 180-4 (e.g., customers, workers or other humans) execute one or more poses, gestures or other actions within a vicinity of the fixture 160, and within a field of view of the imaging device 110. For example, as is shown in FIG. 1C, one or more of the actors 180-1, 180-2, 180-3, 180-4 may independently walk around the fixture 160, extend one or more hands over the fixture 160 and manipulate one or more of the items 10A, 10B, manually and visually evaluate one or more of the items 10A, 10B, place one or more of the items 10A, 10B into a basket, a cart, a pocket or another enclosure or receptacle, return any of the items 10A, 10B to the fixture 160, or place any other items (not shown) onto the fixture 160. Alternatively, or additionally, the actors 180-1, 180-2, 180-3, 180-4 may execute any other movements or actions within a vicinity of the fixture 160. The imaging device 110 may capture images 115-$n$ at any rate as the actors 180-1, 180-2, 180-3, 180-4 execute one or more poses, gestures or other actions. The imaging device 110 may further capture phase disparity data 150-$n$ from the field of view.

The images 115-$n$ captured by the imaging device 110 may be transmitted to the system 170 for processing, such as to detect body parts of any number of actors depicted therein, or to predict whether any of such actors executed shopping events, e.g., taking or picking events, returning or depositing events, or no events at all, based on such images. The phase disparity data 150-$n$ captured by the imaging device 110 may be transmitted to the system 170 for processing, such as to calculate disparities between pixels of the images 115-$n$.

Figure 1D:
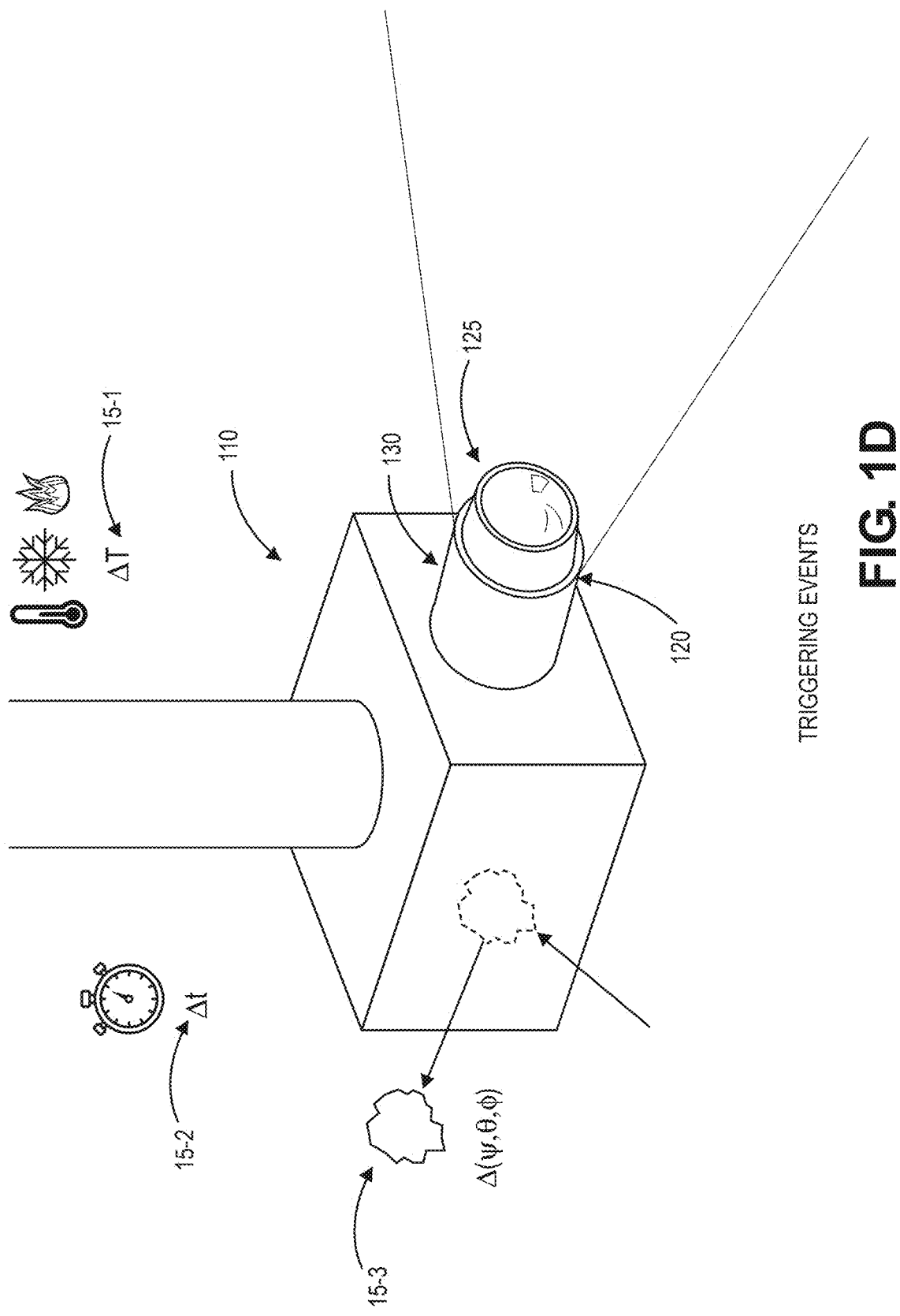

As is shown in FIG. 1D, the lens assembly 120 is mounted to the imaging device 110 in an initial state, and the lens barrel 125 is aligned with an optical axis in a first orientation. The optical axis may be a principal axis, e.g., a roll axis, of the imaging device 110 and provides a degree of rotational symmetry to the imaging device 110.

In some implementations, the systems and methods of the present disclosure may determine whether an imaging device remains in focus upon the occurrence of one or more triggering events, or at any other time. For example, as is shown in FIG. 1D, one triggering event 15-1 may be associated with a change in temperature, or $\Delta T$, which may be detected when temperatures within a vicinity of the imaging device 110 are determined to rise or fall below one or more thresholds or setpoints, or for any other reason. Another triggering event 15-2 may be associated with an elapsed duration or interval of time, or $\Delta t$, since the imaging device was previously evaluated to determine whether objects are in focus. The duration or interval of time, or $\Delta t$, may be of any length. Yet another triggering event 15-3 may be associated with a sensed change in orientation of the imaging device 110, e.g., a change in one or more of a yaw angle $\psi$, a pitch angle $\theta$ or a roll angle $\phi$ of the imaging device 110, such as in response to a shock or another external impact that may be detected by one or more sensors provided on the imaging device 110, or in any other manner. Alternatively, any other triggering event for determining whether the imaging device 110 remains in focus may be specified, e.g., by a human operator.

Figure 1E:
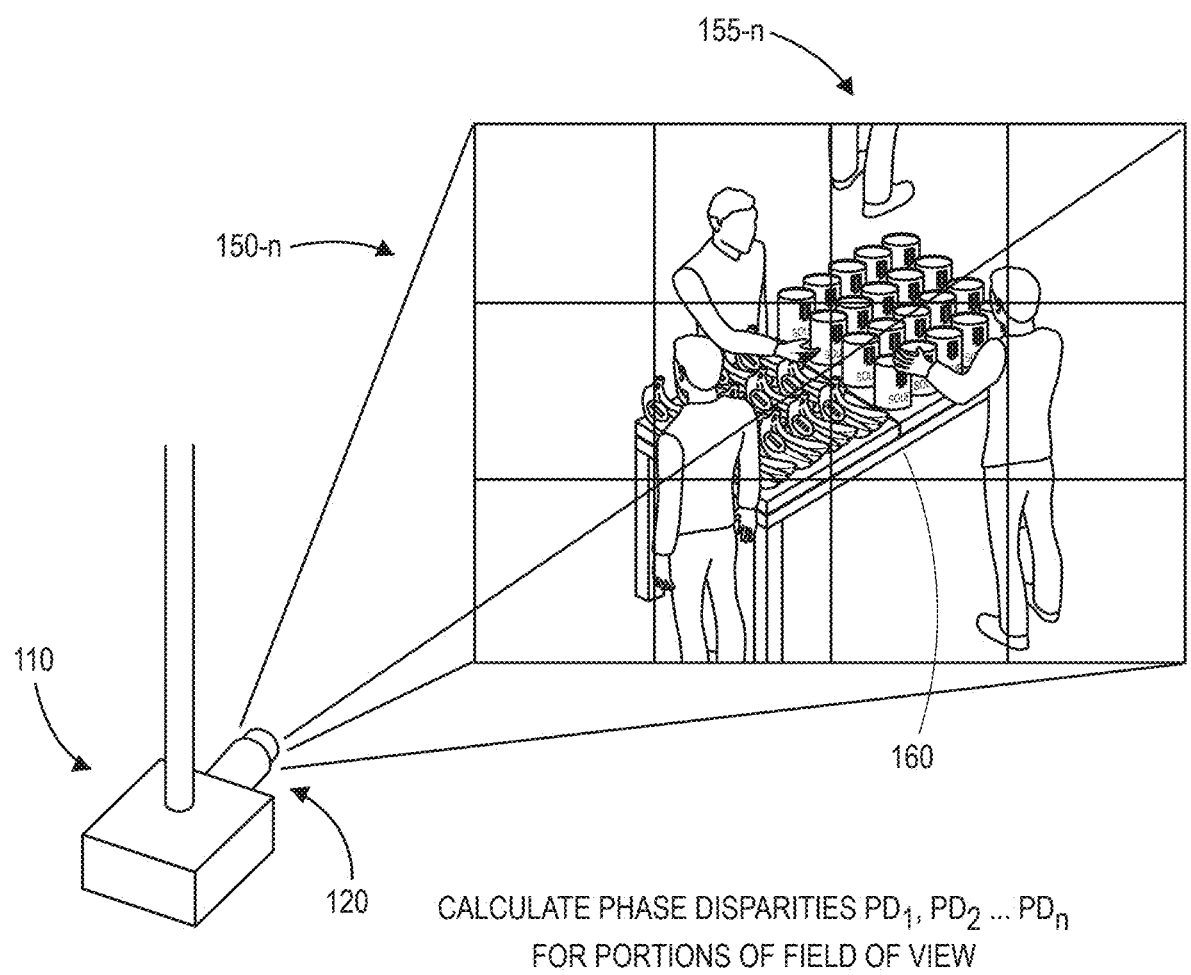

As is shown in FIG. 1E, in response to detecting one or more of the triggering events 15-1, 15-2, 15-3, the imaging device 110 may calculate phase disparities associated with various portions of the field of view of the imaging device 110, such as based on one or more phase disparity pixel sensors of the image sensor 130. For example, as is shown in FIG. 1E, phase disparity values 150-$n$, or $PD_1$, $PD_2$ . . . $PD_n$, may be calculated for each of a plurality of portions 155-$n$ of the field of view of the imaging device 110.

For example, the field of view of the imaging device 110 may be divided into cells or regions arranged in a grid or an array having any number of rows and columns, and the image sensor 130 or one or more processor units of the imaging device 110 may calculate the phase disparity values 150-$n$, or $PD_1$, $PD_2$ . . . $PD_n$, along with confidence levels or factors for each of such values in each of such regions. In some implementations, the field of view of the imaging device 110 may be divided into twelve regions, e.g., in a four region by three region grid, such as is shown in FIG. 1E, and one phase disparity value $PD_i$ and one confidence level or factor may be calculated for each of such regions. Alternatively, the field of view of the imaging device 110 may be divided into any other number of regions, such as forty-eight regions, e.g., in an eight region by six region grid, or one hundred ninety-two regions, e.g., in a sixteen region by twelve region grid.

Figure 1F:
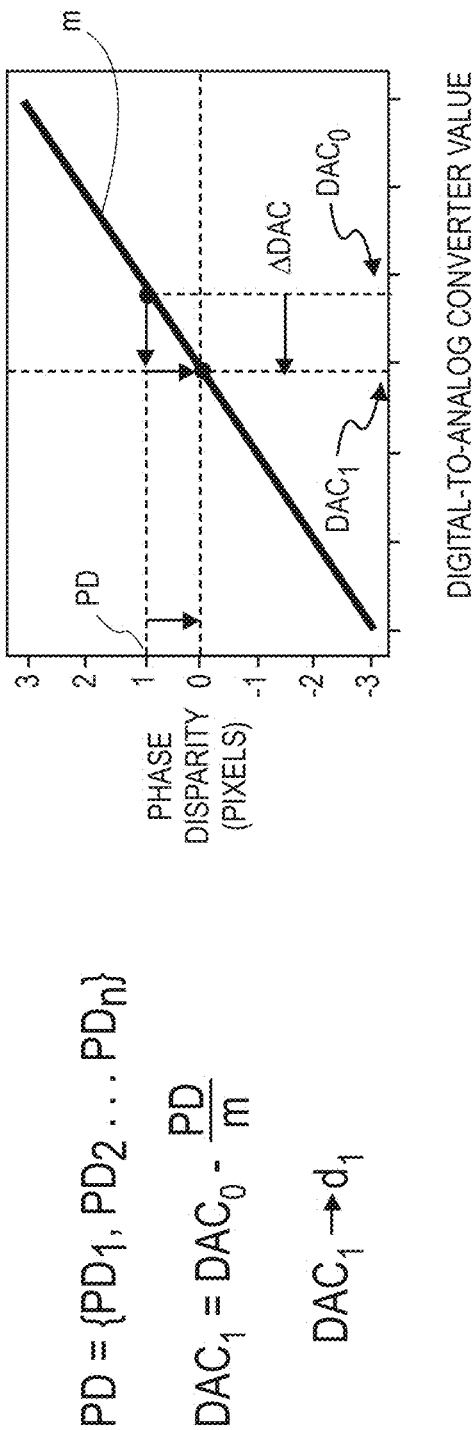

As is shown in FIG. 1F, a representative phase disparity value PD of the phase disparity values $PD_1$, $PD_2$ . . .

$PD_n$ may be calculated. In some implementations, the representative phase disparity value PD may be a median of the phase disparity values $PD_1, PD_2 \ldots PD_n$, a mean of the phase disparity values $PD_1, PD_2 \ldots PD_n$, a mode of the phase disparity values $PD_1, PD_2 \ldots PD_n$, or any measure of central tendency of the phase disparity values $PD_1, PD_2 \ldots PD_n$, or any other value representative of the phase disparity values $PD_1, PD_2 \ldots PD_n$ as a whole. In some implementations, the representative phase disparity value PD may be a "P75" value, a "P90" value, a "P95" value, or any other value representative of the phase disparity values $PD_1, PD_2 \ldots PD_n$ as a whole.

The representative phase disparity value PD may be used to select a digital-to-analog converter value of current to be supplied to the motors 124-1, 124-2, or a voltage for generating the current, to place a nearest lens 122 of the lens barrel 125 at an optimal distance $d_1$ from the image sensor 130. For example, the representative phase disparity value PD may be used to identify a change in a digital-to-analog converter value, or $\Delta DAC$, for a current that is required to minimize the phase disparity of the imaging device 110, based on a fitting constant m calculated for the imaging device 110 and stored in one or more memory components thereon. The fitting constant m may be a slope of a line of best fit between phase disparity values for the imaging device 110 calculated at various distances between a nearest lens 122 of the lens barrel 125 and the image sensor 130, and digital-to-analog conversion values corresponding to the respective distances, or another relationship between phase disparity values and digital-to-analog converter values corresponding to the respective distances. The change in digital-to-analog converter value, or $\Delta DAC$, may represent a difference between a current digital-to-analog converter value, or $DAC_0$, and a next digital-to-analog converter value, or $DAC_1$, at which the phase disparity is expected to be minimized. A current corresponding to the $\Delta DAC$ may be provided to the motors 124-1, 124-2, and the lens barrel 125 may be moved to the optimal distance $d_1$ accordingly.

Alternatively, in some implementations, each of the phase disparity values $PD_1, PD_2 \ldots PD_n$, calculated for the regions may be used to calculate a corresponding digital-to-analog converter value for each one of the regions based on the fitting constant m. A representative value of the digital-to-analog converter values so calculated, e.g., a median, a mean, a mode, or any other representative value of such digital-to-analog converter values, may be selected, and a current corresponding to the representative value of the digital-to-analog converter values may be supplied to the motors 124-1, 124-2 to place the nearest lens 122 of the lens barrel 125 at the optimal distance $d_1$.

Figure 1G:
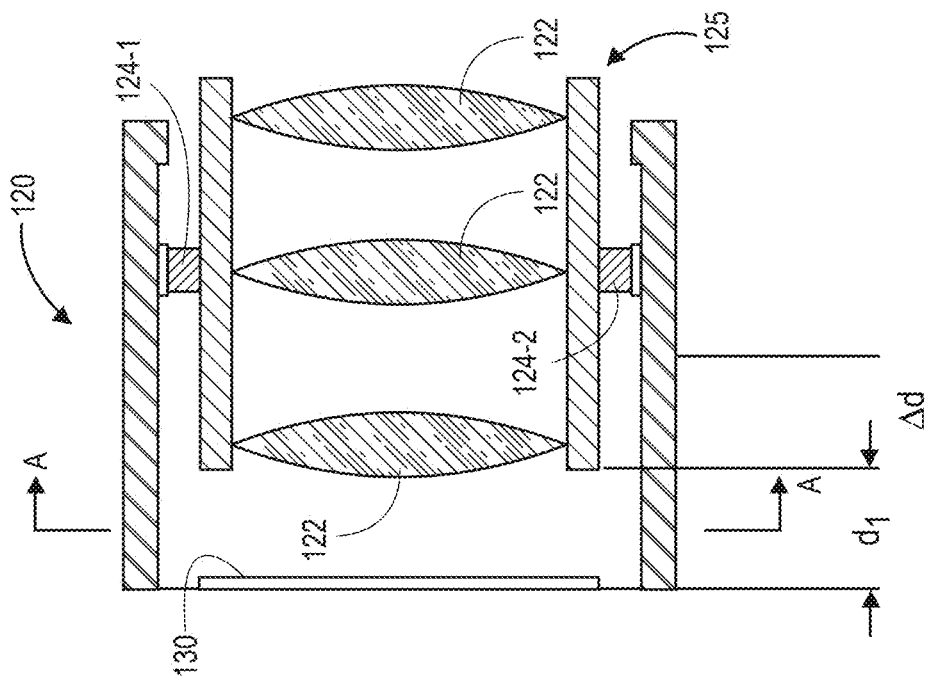
Figure 1G:
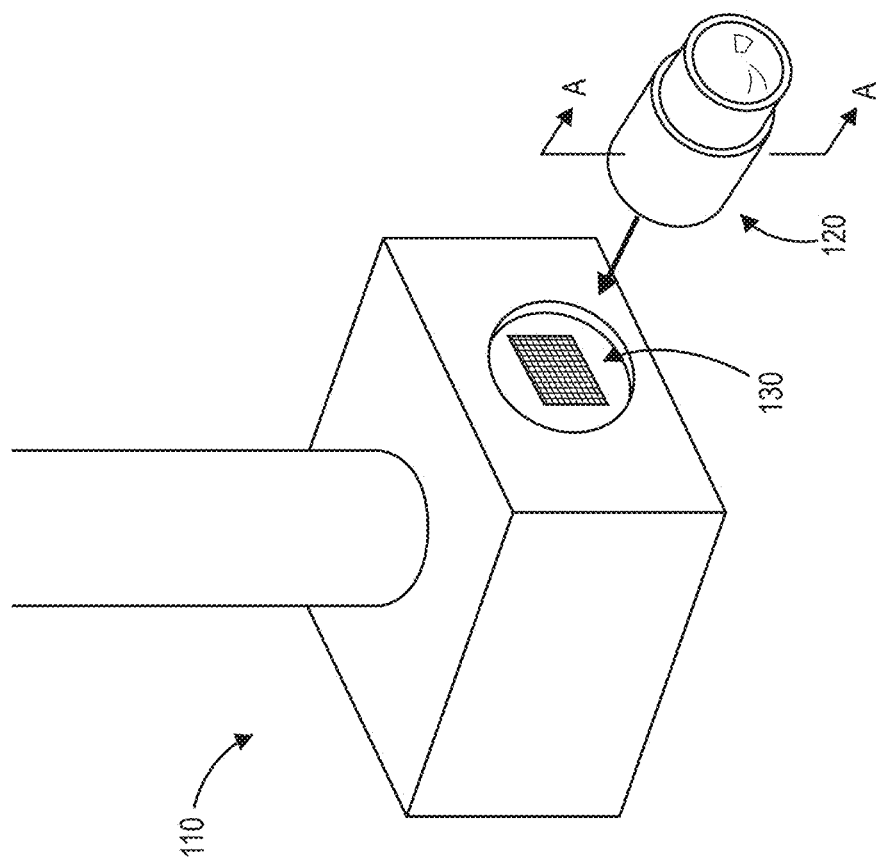

As is shown in FIG. 1G, the lens barrel 125 has been repositioned such that the nearest lens 122 is at the optimal distance $d_1$ from the image sensor 130, e.g., by moving the lens 122 inward toward the image sensor 130 by a distance $\Delta d$.

Images captured by the imaging device 110 may be utilized for any purpose. For example, such images may be provided to a server or another computer device or system over one or more networks, which may include the Internet in whole or in part. In some implementations, servers or other devices or systems may process such images to generate trajectories representing locations, movements or orientations of any actors depicted therein. Alternatively, or additionally, servers or other devices or systems may further receive any other information or data captured by one or more other sensors (not shown), including but not limited to LIDAR sensors, RFID sensors, load sensors, or any other type or form of sensors, which may capture information or data and also provide the information or data to such servers or other devices or systems over one or more networks.

Accordingly, the imaging devices or cameras of the present disclosure may be provided in any environment or scene, such as a retail establishment or another materials handling facility, and aligned to capture imaging data occurring at such environments or scenes. The imaging devices may be mounted above such environments or scenes, such as to ceilings, false ceilings (e.g., to poles, frames, panels or joints), trusses, beams, or other systems. For example, one or more of the imaging devices may be mounted directly to such systems, to one or more threaded tie rods or other components descending from such systems, or in any other manner. Alternatively, in some implementations, the imaging devices of the present disclosure may be mounted to an underside of a structure, such as a shelf, an arch or a bridge, or to an elevated system such as a pole or stanchion. In still other implementations, the imaging devices may be mounted to walls or other vertical surfaces in alignments such that axes of orientation of the camera modules extend within horizontal planes, or planes that are aligned at angles other than vertical.

Reflected light may be captured or detected by an imaging device if the reflected light is within the imaging device's field of view, which is defined as a function of a distance between a sensor and a lens within the imaging device, viz., a focal length, as well as a location of the imaging device and an angular orientation of the imaging device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, an imaging device may be configured in a fixed position, or with a fixed focal length (e.g., fixed-focus lenses) or angular orientation. Alternatively, a imaging device may include one or more actuated or motorized features for adjusting a position of the imaging device, or for adjusting either the focal length (e.g., zooming the imaging device) or the angular orientation (e.g., the roll angle, the pitch angle or the yaw angle) of the imaging device, by causing a change in a distance between the sensor and the lens (e.g., optical zoom lenses or digital zoom lenses), a change in a location of the imaging device, or a change in one or more of the angles defining an angular orientation.

Figure 2:
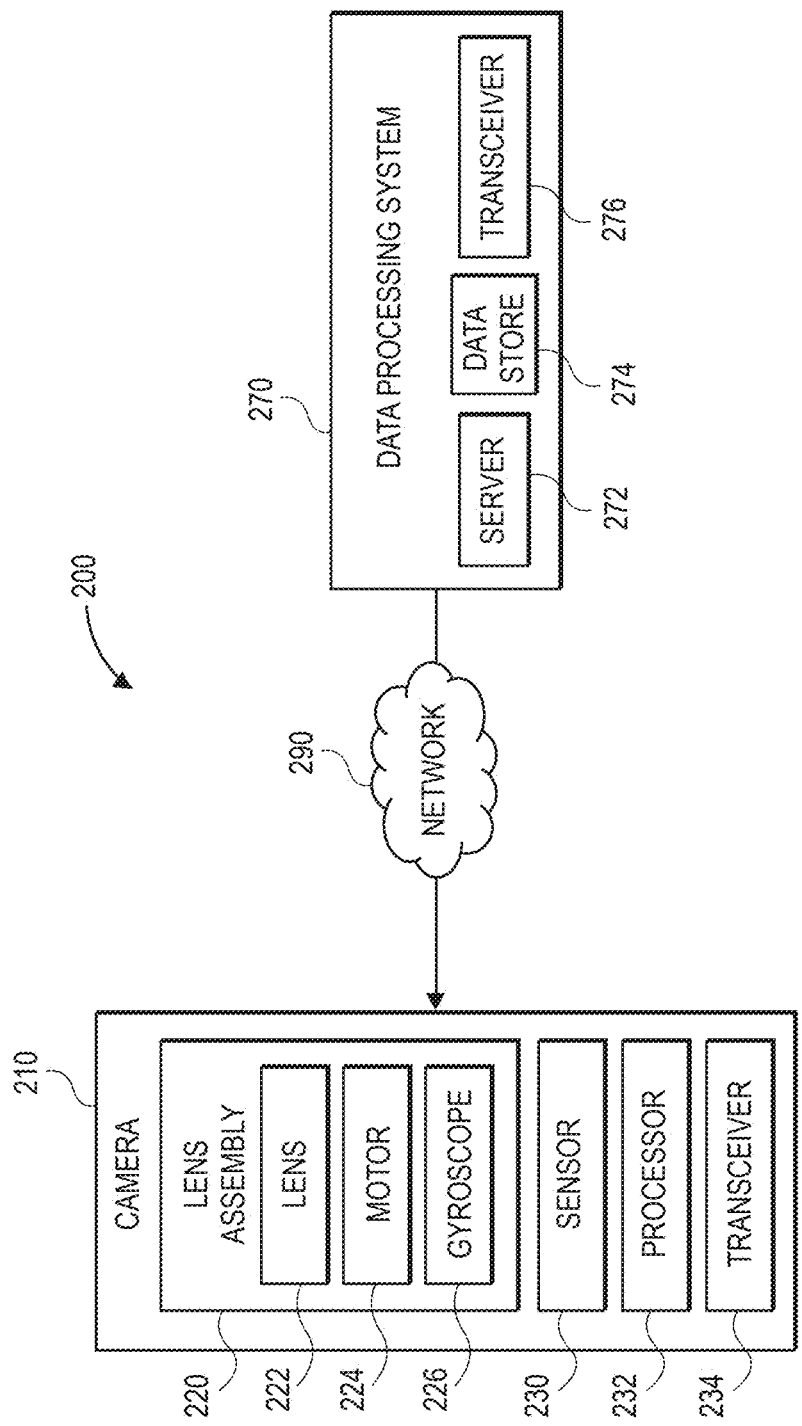
FIG. 2 is a block diagram of one system including a camera system in accordance with implementations of the present disclosure.

Referring to FIG. 2, a block diagram of components of one system in accordance with implementations of the present disclosure is shown. Except where otherwise noted, reference numerals preceded by the number "2" shown in FIG. 2 indicate components or features that are similar to components or features having reference numerals preceded by the number "1" shown in FIGS. 1A through 1G.

As is shown in FIG. 2, a system 200 includes a camera 210 (or another imaging device) 210 and a data processing system 270 that are connected to one another over one or more networks 290, which may include the Internet, in whole or in part.

The camera 210 may be any form of optical recording device that may be used to photograph or otherwise record imaging data of structures, facilities, terrain or any other elements appearing within a field of view. The camera 210 may include a lens assembly 220, one or more image sensors 230, processors 232 and a transceiver 234, or any other component (not shown), such as one or more filters, chips, electrodes, clocks, boards, timers, power sources, connectors or any other relevant features (not shown).

The camera 210 may be configured to capture imaging data in the form of one or more still or moving images of any kind or form, as well as any relevant audio signals or other information. The camera 210 may also be independently adapted or otherwise configured to communicate with the data processing system 270 or any other external computer systems (not shown) by way of the network 290. The camera 210 may operate under the control of the processors 232 or any other processing unit (not shown) that may be accessible to the camera 210, e.g., over the networks 290.

The image sensors 230 may be or include one or more visual sensors (e.g., color or "RGB" sensors, grayscale sensors and/or black-and-white sensors), depth sensors, or any other sensors that are configured to capture visual imaging data (e.g., textures), depth imaging data (e.g., ranges) or any other imaging data regarding objects within one or more fields of view of the camera 210. For example, the image sensors 230 may be any sensors having single elements or a plurality of photoreceptors or photosensitive components (e.g., a CCD sensor, a CMOS sensor, or another sensor), which may be typically arranged in an array. Light reflected from objects within a field of view of the camera 210 may be captured by the image sensor 230, and quantitative values, e.g., pixels, may be assigned to one or more aspects of the reflected light. In some embodiments, the camera 210 may further include one or more illuminators (not shown), such as a laser system or a light-emitting diode (or "LED") for illuminating a portion of a scene appearing within a field of view of the camera 210 with light at any wavelength.

In some implementations, the image sensors 230 may further include a plurality of pixel sensors for determining phase disparities that are embedded with other pixel sensors, e.g., visual sensors or depth sensors. For example, the image sensors 230 may include left phase disparity pixel sensors and right phase disparity pixel sensors within an active pixel area, in any concentration or density. In some implementations, the image sensors 230 may include pairs of left phase disparity pixel sensors and right phase disparity pixel sensors distributed within an array of visual pixel sensors, such as four pairs of left phase disparity pixel sensors and right phase disparity pixel sensors within a square array of eight pixel sensors by eight pixel sensors in size, or four pairs of left phase disparity pixel sensors and right phase disparity pixel sensors within a square array of sixteen pixel sensors by sixteen pixel sensors in size.

In some embodiments, the camera 210 may have both a depth sensor and an RGB sensor (or grayscale sensor or black-and-white sensor). Alternatively, the camera 210 may have just a depth sensor or just an RGB sensor. For example, the camera 210 may be an RGB color camera, a still camera, a motion capture/video camera or any other type or form of camera. In other implementations, the camera 210 may be depth-sensing cameras, such as an RGBz or RGBD camera. In still other implementations, the camera 210 may be a thermographic or infrared (IR) camera. Additionally, in some implementations, the camera 210 may simply be a camera module that includes a lens and an image sensor configured to convert an optical image obtained using the lens of the camera into a digital signal or digital representation of the image (generally referred to herein as imaging data).

The camera 210 may further include any other components (not shown) that may be required in order to capture, analyze and/or store imaging data. For example, the camera 210 may capture one or more still or moving images (e.g., streams of visual and/or depth image frames), along with any relevant audio signals or other information (e.g., position data), and may also connect to or otherwise communicate with the data processing system 270, or any other computer devices over the networks 290, through the sending and receiving of digital data by way of the transceiver 234 or directly.

In some embodiments, the processors 232 may be configured to select an exposure time or shutter speed for the camera 210. In some embodiments, the processors 232 may be configured to select an aperture or focal ratio for the camera 210. In some embodiments, the processors 232 may be configured to select a level of gain for the camera 210. In some embodiments, the processors 232 may be configured to execute one or more algorithms for automatically controlling the operation of the camera 210, including one or more algorithms for automatically selecting one or more of the exposure time or shutter speed, the aperture or focal ratio, or the gain of the camera 210, and operating the camera 210 with the selected exposure time or shutter speed, the selected aperture or focal ratio or the selected gain.

The processors 232 may also be configured to process imaging data captured by one or more of the image sensors 230, or take any other action. For example, in some embodiments, the processors 232 may be configured to identify one or more brightness or intensity levels or other attributes of images, or of select portions of images, captured by the camera 210 or any other imaging device (not shown), e.g., a histogram of brightness or intensities associated with one or more pixels. The processors 232 may further receive instructions from an external source, e.g., the data processing system 270, in identifying the select portions of the images for which brightnesses, intensity levels or other attributes are to be determined. In some embodiments, the processors 232 may execute one or more algorithms for automatically controlling the operation of the camera 210 based on selected exposure times or shutter speeds, selected apertures or focal ratios, or selected gains, as determined based on brightness or intensity levels or other attributes of images, or of select portions of images. In some other embodiments, the processors 232 may be configured to execute any other type or form of algorithm, including but not limited to machine learning algorithms, e.g., an artificial neural network.

The transceiver 234 enables the camera 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the networks 290 or directly. The transceiver 234 may further include or be in communication with one or more input/output (or "I/O") interfaces, network interfaces and/or input/output devices, and may be configured to allow information or data to be exchanged between one or more of the components of the camera 210, or to one or more other computer devices or systems (not shown) via the networks 290. For example, in some embodiments, the transceiver 234 may be configured to coordinate I/O traffic between the processors 232 and one or more onboard or external computer devices or components. The transceiver 234 may perform any necessary protocol, timing or other data transformations in order to convert data signals from a first format suitable for use by one component into a second format suitable for use by another component. In some embodiments, the transceiver 234 may include support for devices attached through various types of peripheral buses, e.g., variants of the Peripheral Component Interconnect ("PCI") bus standard or the USB standard. In some other embodiments, functions of the transceiver 234 may be split into two or more separate components, or incorporated directly into the processors 232.

In some embodiments, the transceiver 234 may transmit and/or receive signals according to the Bluetooth® Low Energy standard, e.g., within a frequency spectrum of approximately 2.4000 to 2.4835 gigahertz (GHz), and in two-megahertz (2 MHz) channels, or according to the Ultra-Wideband standard, e.g., within a frequency spectrum of approximately 3.1 to 10.6 gigahertz (GHz), with bandwidths of at least five hundred megahertz (500 MHz), or at least twenty percent of a center frequency. The transceiver 234 may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceiver 234 may be of any kind or type, and may be sent over the networks 290.

In some implementations, the camera 210 may be hard-mounted to a support or mounting that maintains the device in a fixed configuration or angle with respect to one, two or three axes. Alternatively, however, the camera 210 may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

The camera 210 may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

The camera 210 may also include manual or automatic features for modifying a field of view of the camera 210, or an orientation of the camera 210. For example, as is shown in FIG. 2, the lens assembly 220 includes one or more lenses 222, one or more motors 224 and one or more gyroscopes 226 (or other position sensors).

The lenses 222 may be one or more optical elements or devices for focusing light beams, e.g., onto surfaces of the sensor 230 or in any other location. The lenses 222 may be aligned or coaligned along a common axis (e.g., an optical axis) with respect to a housing or other structure or system.

The motors 224 may be voice coil motors, servos or any other motors that are coupled to one or more of the lenses 222 and configured to move the lenses 222 with respect to the sensor 230 along an optical axis of the lens assembly 220 or the camera 210, e.g., for focusing.

In some implementations, such as where the lens assembly 220 includes a single lens 222, the motors 224 may be configured to move the single lens 222 in one or more directions along an optical axis of the lens assembly 220 or the camera 210. In some other implementations, such as where the lens assembly 220 includes multiple lenses, the motors 224 may be configured to move one of the lenses 222, and each of the other lenses 222 may remain stationary with respect to a housing or other structure of the lens assembly 220. Moreover, in some implementations, where the lens assembly 220 includes multiple lenses, the lens assembly 220 may include a first motor 224 for moving one of the lenses 222 in a first direction along an optical axis of the lens assembly 220 or the camera 210, and a second motor 224 for moving the one of the lenses 222 in a second direction along the optical axis.

The gyroscopes 226 may be any mechanical or electrical device, component, system, or instrument for determining an orientation, e.g., an orientation of an optical axis of the lens assembly 220 or the camera 210. For example, the gyroscopes 226 may be traditional mechanical gyroscopes, each having at least a pair of gimbals and a flywheel or rotor. Alternatively, the gyroscopes 226 may be electrical components such as dynamically tuned gyroscopes, fiber optic gyroscopes, hemispherical resonator gyroscopes, London moment gyroscopes, microelectromechanical sensor gyroscopes, ring laser gyroscopes, or vibrating structure gyroscopes, or any other type or form of electrical component for determining an orientation of the lens assembly 220 or the camera 210. In some embodiments, the gyroscopes 226 may generate angular rate data in any direction or along or about any axis.

Alternatively, or in addition to the gyroscopes 226, the lens assembly 220 may further include one or more accelerometers, e.g., mechanical or electrical devices, components, systems, or instruments for sensing or measuring accelerations in any direction or along or about any axis, including but not limited to devices having one or more potentiometers, linear variable differential transformers, variable reluctance devices or piezoelectric components. Likewise, alternatively, or in addition to the gyroscopes 226, the lens assembly 220 may also include one or more compasses, or any devices, components, systems, or instruments adapted to determine one or more directions with respect to a frame of reference that is fixed with respect to the surface of the Earth (e.g., a pole thereof), such as one or more magnetometers or other electrical components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like).

The data processing system 270 includes one or more physical computer servers 272 having one or more data stores 274 (e.g., databases) and any number of transceivers 276 associated therewith, and may be provided for any specific or general purpose. For example, the data processing system 270 of FIG. 2 may be independently provided for the exclusive purpose of receiving, analyzing or storing imaging data or other information or data received from the camera 210 or, alternatively, provided in connection with one or more physical or virtual services that are configured to receive, analyze or store such imaging data or other information or data, as well as to perform one or more other functions. In some implementations, the data processing system 270 may be associated with a materials handling facility, or any other physical or virtual facility.

The servers 272 may be connected to, communicate with, or include, the data stores 274 or the transceivers 276. The data stores 274 may store any type of information or data, including but not limited to imaging data, acoustic signals, information or data relating to the imaging data, or information or data regarding acoustic signals, environmental conditions, operational characteristics, or positions associated with the imaging data, which may be captured by the camera 210 or any other sensor and utilized for any purpose. The servers 272, the data stores 274 and/or the transceivers 276 may also connect to or otherwise communicate with the networks 290, through the sending and receiving of digital data. For example, the data processing system 270 may include any facilities, stations or locations having the ability or capacity to receive and store information or data, such as media files, in one or more data stores, e.g., media files received from the camera 210 from one or more other external computer systems (not shown) via the networks 290. In some implementations, the data processing system 270 may be provided in a physical location. In other such implementations, the data processing system 270 may be provided in one or more alternate or virtual locations, e.g., in a "cloud"-based environment.

The transceivers 276 enable the data processing system 270 to communicate through one or more wired or wireless means, e.g., wired technologies such as USB or fiber optic cable, or standard wireless protocols such as Bluetooth® or any Wi-Fi protocol, such as over the networks 290 or directly. The transceivers 276 may have one or more of the same attributes or characteristics of the transceiver 234 described above, or one or more other attributes, features or characteristics.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The data and/or computer-executable instructions, programs, firmware, software and the like (also referred to herein as "computer-executable" components) described herein may be stored on a computer-readable medium that is within or accessible by computers or computer components such as the processor 232 or the server 272, or any other computers or systems utilized by the camera 210 or the data processing system 270, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the system 200 of FIG. 2 includes a single box corresponding to a camera 210, those of ordinary skill in the pertinent arts will recognize that any number or type of cameras 210 each having any number of lenses 222 may be operated in accordance with the present disclosure, and in any type or form of environment, scene or facility, such as a materials handling facility. For example, in some implementations, the system 200 may include dozens or even hundreds of cameras 210 of any type or form, which may be mounted in regular or irregular configurations over or in association with a materials handling facility or other environment or scene in any manner.

As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

Figure 3:
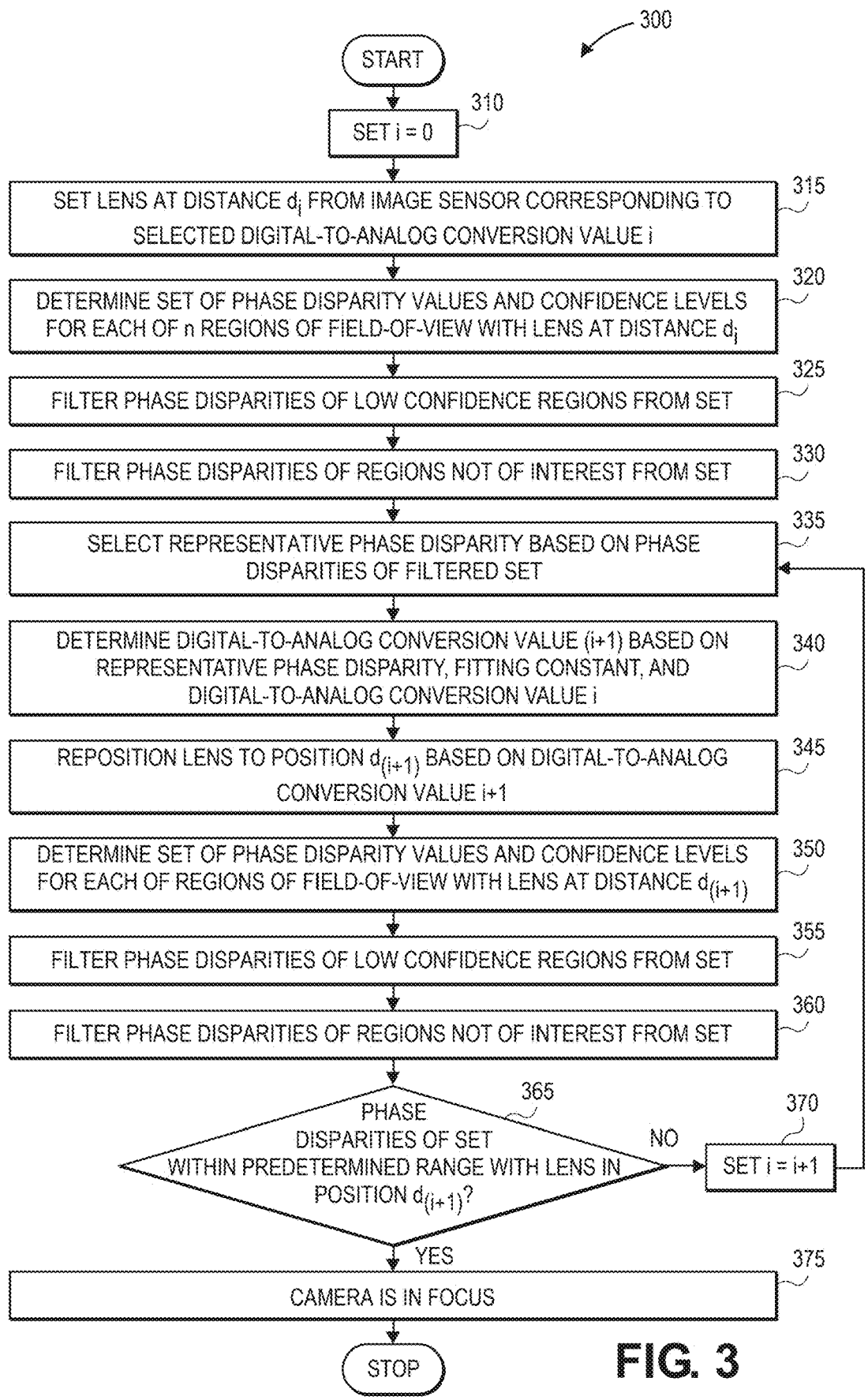
FIG. 3 is a flow chart of one process in accordance with implementations of the present disclosure.

Referring to FIG. 3, a flow chart 300 of one process in accordance with implementations of the present disclosure is shown. At box 310, a value of a step variable i is set equal to zero, or i=0. At box 315, a lens is set at a distance $d_1$ from an image sensor corresponding to a selected digital-to-analog conversion value i. For example, where the lens is provided in association with a lens barrel or a lens assembly and coupled to one or more motors (e.g., servos or voice coil motors), and a current corresponding to the selected digital-to-analog conversion value i is supplied to the motors, the motors cause the lens to be placed at a position corresponding to a distance $d_i$ from the sensor, which may be selected on any basis and for any reason. In some implementations, the distance $d_i$ may be selected to cause objects that are located at a predetermined focusing range or distance from the sensor to be in clear focus within images captured by the camera.

At box 320, a set of phase disparity values and confidence levels are determined for each of a plurality of n regions of the field of view with the lens at the distance $d_i$ from the image sensor. For example, the image sensor may include a plurality of phase disparity pixel sensors distributed among other pixel sensors. Phase disparity values may be calculated based using pixel sensors of the image sensor that are dedicated to the respective regions. Additionally, phase disparity values and their respective confidence levels may be calculated based on data received by the phase disparity sensors at times that images are captured, or at different times.

In some implementations, confidence levels for each of the regions may be calculated based on the phase disparity values. For example, regions of a field of view of the camera that lack foreground features, or objects in motion, such as walls, floors or other static objects, may have confidence levels that are comparatively low, while regions of the field of view that include dynamic objects or foreground features may have confidence levels that are comparatively high.

At box 325, phase disparities from low-confidence regions are filtered from the set of phase disparity values determined at box 320. For example, where confidence levels calculated at box 320 have a range between zero and one, a threshold for excluding regions with low-confidence phase disparities, such as 0.4 or another value, may be set. Filtering regions with low-confidence phase disparities from the set is done with a goal of focusing the camera on prominent regions within the field of view, such as regions including shelves, carts, racks, or other storage units having one or more items thereon.

At box 330, phase disparities from regions that are not of interest are filtered from the set of phase disparity values determined at box 320. For example, where a field of view includes objects of interest such as shelves, tables, racks or other storage units, or doors or other entryways, phase disparity values determined for regions of a field of view of the camera that include such objects may remain within the set, while phase disparity values determined for other regions of the field of view may be disregarded. A region of a field of view of a camera may be identified as being of interest for any reason or according to any standard.

In some implementations, only phase disparities from low-confidence regions may be filtered from the set, and whether a region of the field of view is of interest or not need not be considered. In some other implementations, only regions of the field of view that are not of interest may be filtered from the set, and confidence levels in phase disparity values calculated for such regions need not be considered. Further, in some implementations, none of the regions need be filtered from the set, regardless of the confidence levels calculated for such regions, or whether such regions are of interest.

At box 335, a representative phase disparity value is selected based on the phase disparity values of the filtered set. The representative phase disparity value may be any value representative of the phase disparity values of the filtered set as a whole, such as a median, a mean, a mode, any measure of central tendency or any other value, such as a "P75" value, a "P90" value, a "P95" value, or others.

At box 340, a digital-to-analog converter value (i+1) is determined based on the representative phase disparity value calculated at box 335, a fitting constant for the camera, and the digital-to-analog converter value i. For example, the representative phase disparity value may be used to identify a change in a digital-to-analog converter value corresponding to a current required to minimize the phase disparity of the camera, based on a fitting constant, or a slope of a line of best fit between phase disparity values for the camera calculated at various distances between a lens and an image sensor, as well as digital-to-analog conversion values corresponding to the respective distances, or another relationship between phase disparity values and digital-to-analog converter values corresponding to the respective distances.

Alternatively, the digital-to-analog converter value (i+1) may be calculated based on individual phase disparity values of the filtered set, in any other manner.

At box 345, the lens is repositioned to a position at a distance $d_{(i+1)}$ from the image sensor based on the digital-to-analog conversion value i+1 determined for the camera at box 340. For example, a current corresponding to the selected digital-to-analog conversion value i may be supplied to one or more motors coupled to a lens barrel, the motors causing the lens to be placed at a position corresponding to a distance $d_{(i+1)}$.

At box 350, a set of phase disparity values and confidence levels for each of the n regions is determined with the lens in the position at the distance $d_{(i+1)}$. The set of phase disparity values and confidence levels may be calculated in the same manner as described above in connection with box 320, or in any other manner. At box 355, phase disparities from low-confidence regions are filtered from the set of phase disparity values determined at box 350. Likewise, the phase disparities from the low-confidence regions may be filtered subject to the same threshold as in box 325, or subject to a greater or lesser threshold, and in the same manner as described above in connection with box 325, or in any other manner.

At box 360, phase disparities from regions that are not of interest are filtered from the set of phase disparity values determined at box 350. The regions that are not of interest may be the same regions filtered from the set at box 330, or other regions that are not of interest, and may be identified as such for any reason or according to any standard.

In some implementations, only phase disparities from low-confidence regions may be filtered from the set. In some other implementations, only regions of the field of view that are not of interest may be filtered from the set. Further, in some implementations, none of the regions need be filtered from the set.

At box 365, whether the phase disparities of the filtered set are within a predetermined range with the lens in the position $d_{(i+1)}$ determined at box 345 is determined. If at least one of the phase disparities of the filtered set is not within a predetermined range with the lens in the position $d_{(i+1)}$, then the process advances to box 370, where a value of the step variable i is incremented by one, or where i=i+1, before returning to box 335, where a representative phase disparity value is selected based on the phase disparities of the filtered set. If each of the phase disparities determined at box 350 is within the predetermined range with the lens in the position $d_{(i+1)}$, however, then the process advances to box 375, where the camera is determined to be in focus, and the process ends.

Referring to FIGS. 4A through 4E, views of aspects of one system in accordance with implementations of the present disclosure are shown. Except where otherwise noted, reference numerals preceded by the number "4" shown in FIGS. 4A through 4E indicate components or features that are similar to components or features having reference numerals preceded by the number "2" shown in FIG. 2 or by the number "1" shown in FIGS. 1A through 1G.

Figure 4A:
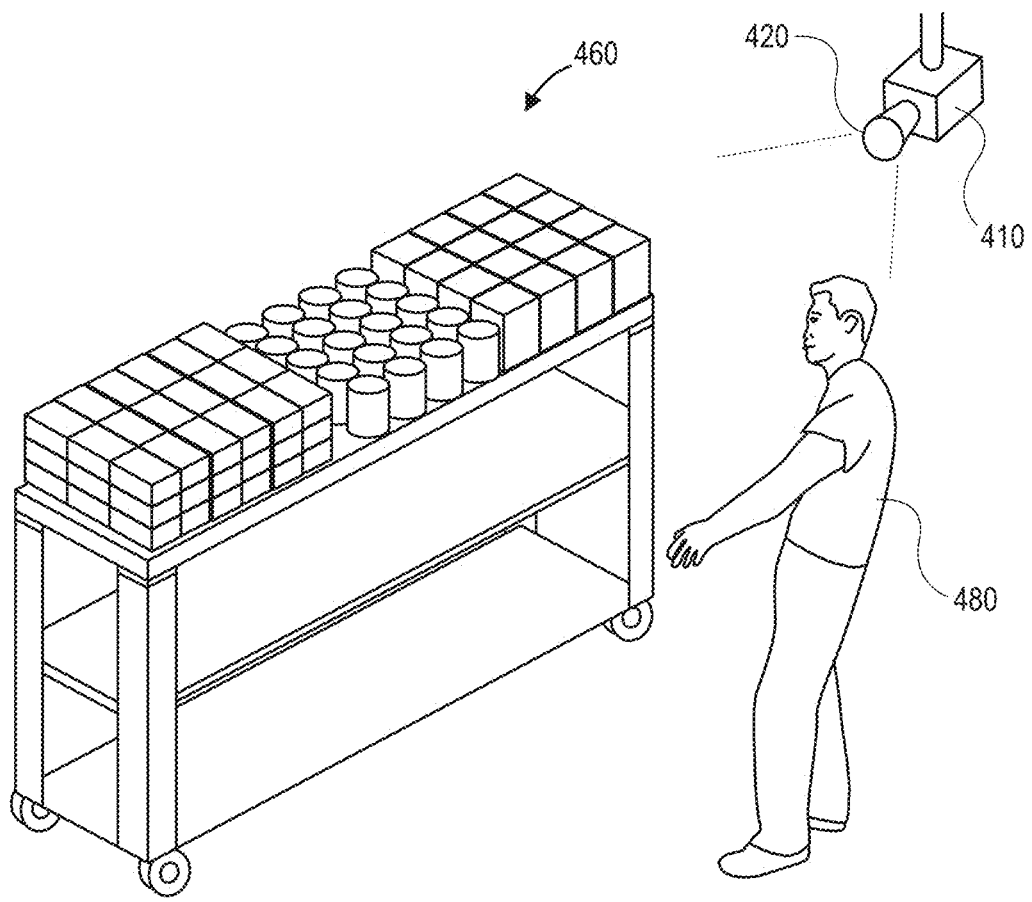
FIGS. 4A through 4E are views of aspects of one system in accordance with implementations of the present disclosure.

As is shown in FIG. 4A, a system includes a camera (or another imaging device) 410 provided in an environment, a scene or a facility as a materials handling facility, a fulfillment center, a warehouse, or any other like facility, and an inventory storage unit 460 (e.g., a set of inventory shelves), or an inventory storage area, having a plurality of sets of items in designated item spaces or locations on the inventory storage unit 460. The environment, the scene or the facility in which the camera 410 is mounted may be any open or enclosed environment or space in which any number of actors 480 (e.g., humans, other animals or machines) may execute one or more poses, gestures, movements or other interactions within a field of view of the camera 410.

The camera 410 includes a lens assembly 420 having any number of lenses, memory or storage components, photosensitive surfaces, filters, chips, electrodes, clocks, boards, timers, power sources, connectors or any other components. Although the system of FIG. 4A includes only a single camera 410, one or more other cameras 410 (not shown) may be mounted in a similar manner to the camera 410 in the environment, the scene or the facility, in any location or orientation with respect to one another, and such cameras 410 may be installed or otherwise operated independently or as components of a camera network (or an imaging device network). For example, the camera 410 may be in communication with one or more computer devices or systems (not shown), e.g., over one or more computer networks, and such devices or systems may include one or more databases or other data stores having information regarding attributes that are, have been or might be stored on the inventory storage unit 460, e.g., one or more of the sets of items.

The camera 410 may be configured to capture visual images (e.g., color, grayscale, or black-and-white images), or any other type or form of imaging data (e.g., depth images). In some implementations, the camera 410 may include one or more sensors that are configured to capture visual imaging data at relatively high levels of resolution, e.g., eight to nine megapixels per image, and at relatively high frame rates, e.g., fifteen or more frames per second (fps). Such sensors may include arrays of photodetectors or photosensitive components such as CCD sensors, CMOS sensors, photodiodes, or the like. Such sensors may capture light scattered or reflected from objects and assign one or more quantitative values (e.g., red, green, blue or other color values, or distances or ranges to such objects) to aspects of the scattered or reflected light. Alternatively, or additionally, in some implementations, the camera 410 may be configured to capture any other imaging data, such as depth imaging data, or visual imaging data at any levels of resolution or frame rates.

In some implementations, the camera 410 may further include a plurality of pixel sensors for determining phase disparities that are embedded with other pixel sensors, e.g., visual sensors or depth sensors. For example, the camera 410 may include left phase disparity pixel sensors and right phase disparity pixel sensors within an active pixel area, in any concentration or density. In some implementations, the camera 410 may include pairs of left phase disparity pixel sensors and right phase disparity pixel sensors distributed within an array of visual pixel sensors, such as four pairs of left phase disparity pixel sensors and right phase disparity pixel sensors within a square array of eight pixel sensors by eight pixel sensors in size, or four pairs of left phase disparity pixel sensors and right phase disparity pixel sensors within a square array of sixteen pixel sensors by sixteen pixel sensors in size.

Additionally, in some implementations, the camera 410 may be self-powered, e.g., by one or more power sources internal to or onboard the camera 410, such as batteries or fuel cells. In some other implementations, however, the camera 410 may receive alternating current (or AC) or direct current (or DC) power from one or more external power sources, e.g., by one or more conductors or other connectors. For example, the camera 410 may receive power by a dedicated connection to external devices or systems, or power sources, e.g., according to a Power over Ethernet (or "PoE") or a USB standard or system that may also be utilized to transfer information or data to or from the camera 410.

Figure 4B:
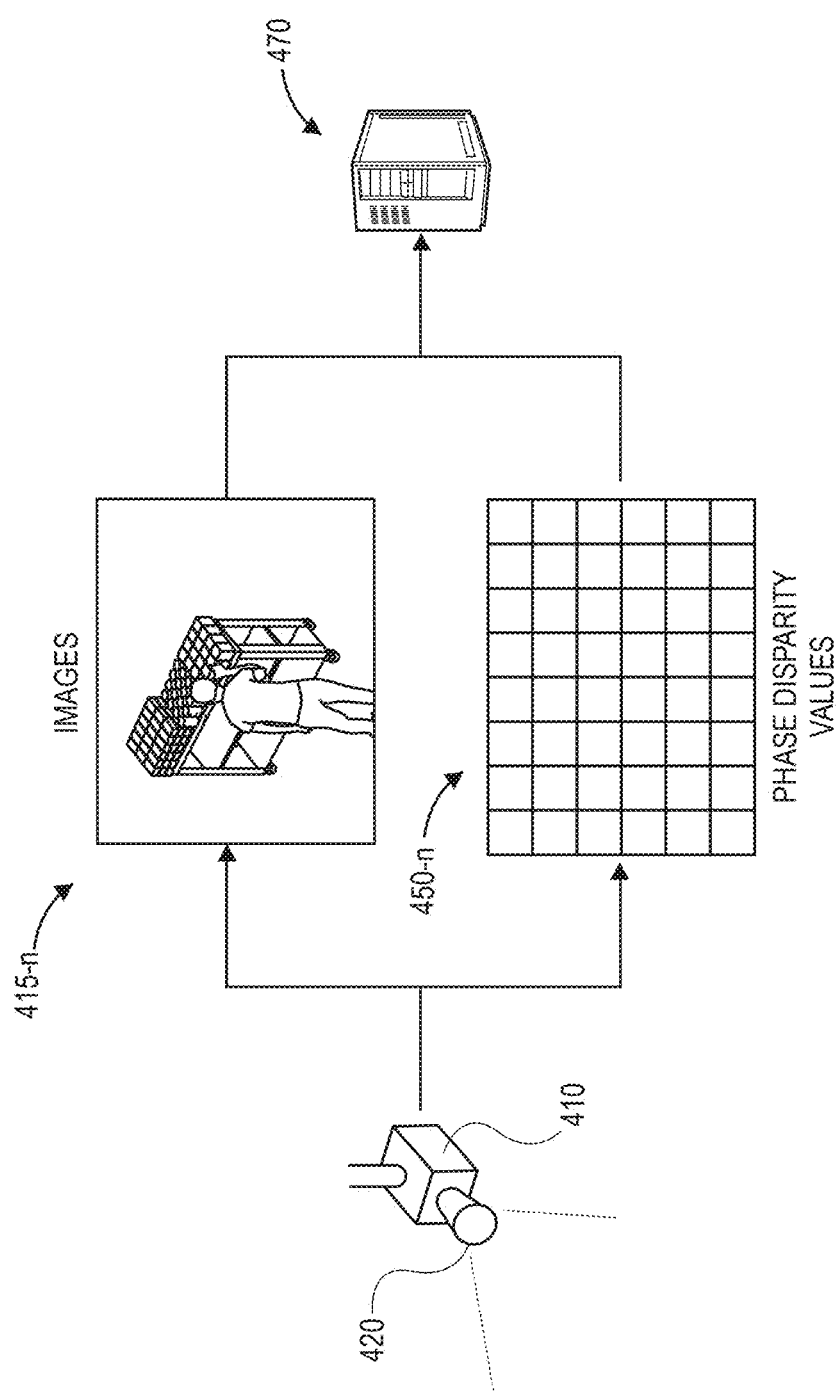

As is shown in FIG. 4B, the camera 410 is configured to capture a plurality of images 415-$n$ and to calculate a plurality of sets of phase disparity values 450-$n$ at any rate or frequency. For example, in some implementations, the camera 410 may be configured to capture the images 415-$n$ at a rate of fifteen or more frames per second (fps). In some implementations, the camera 410 may be configured to calculate the phase disparity values 450-$n$ at the same rate that the images 415-$n$ are captured, or at a different rate or frequency. The camera 410 is further configured to transmit the images 415-$n$ and the phase disparity values 450-$n$ to an external computer server 470 or another device or system over one or more networks. The server 470 may be provided in the same physical location as the camera 410, or in one or more alternate or virtual locations, e.g., in a "cloud"-based environment.

Figure 4C:
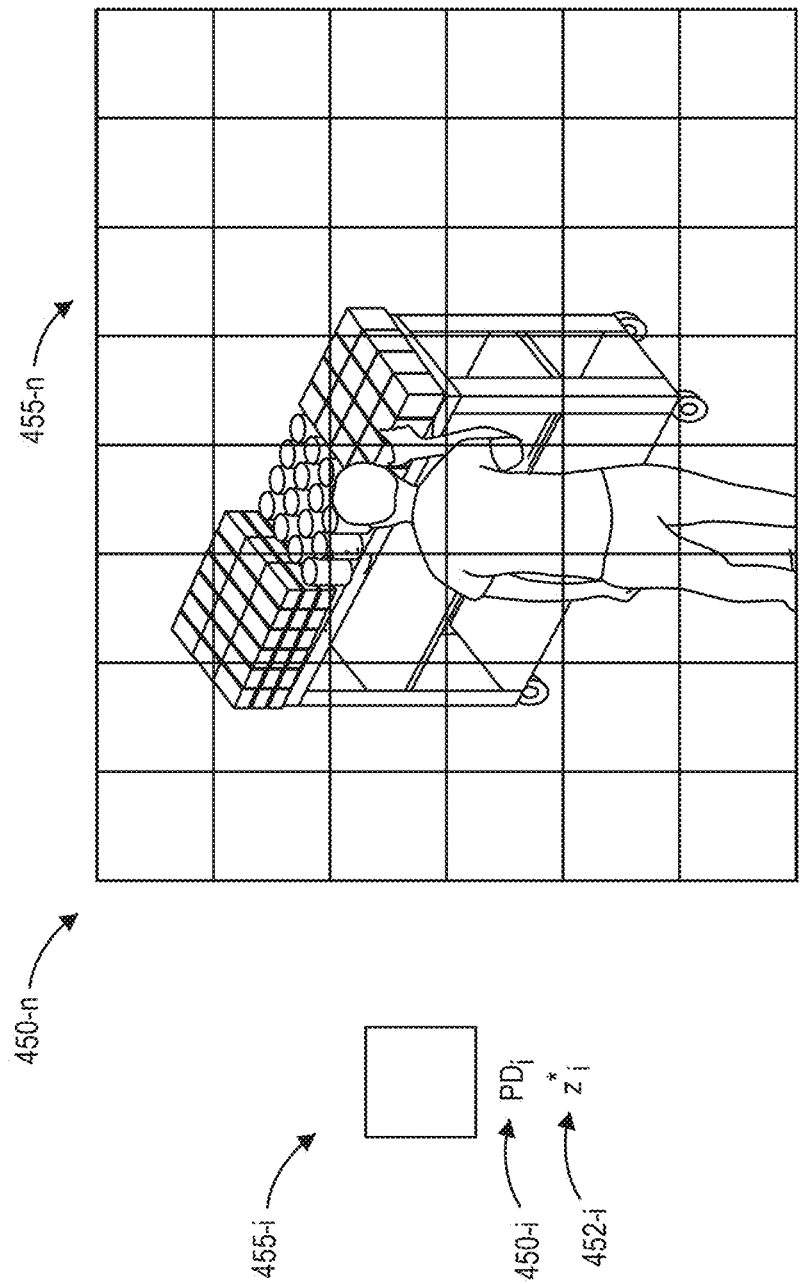

As is shown in FIG. 4C, the camera 410 determines the plurality of phase disparity values 450-$n$ and confidence levels in such phase disparity values 450-$n$ for each of a plurality of regions 455-$n$ of a field of view of the camera 410. For example, as is shown in FIG. 4C, for each representative region 455-$i$ of the regions 455-$n$, a phase disparity value 450-$i$ and a confidence level 452-$i$ in the phase disparity value 450-$i$ is determined.

Figure 4D:
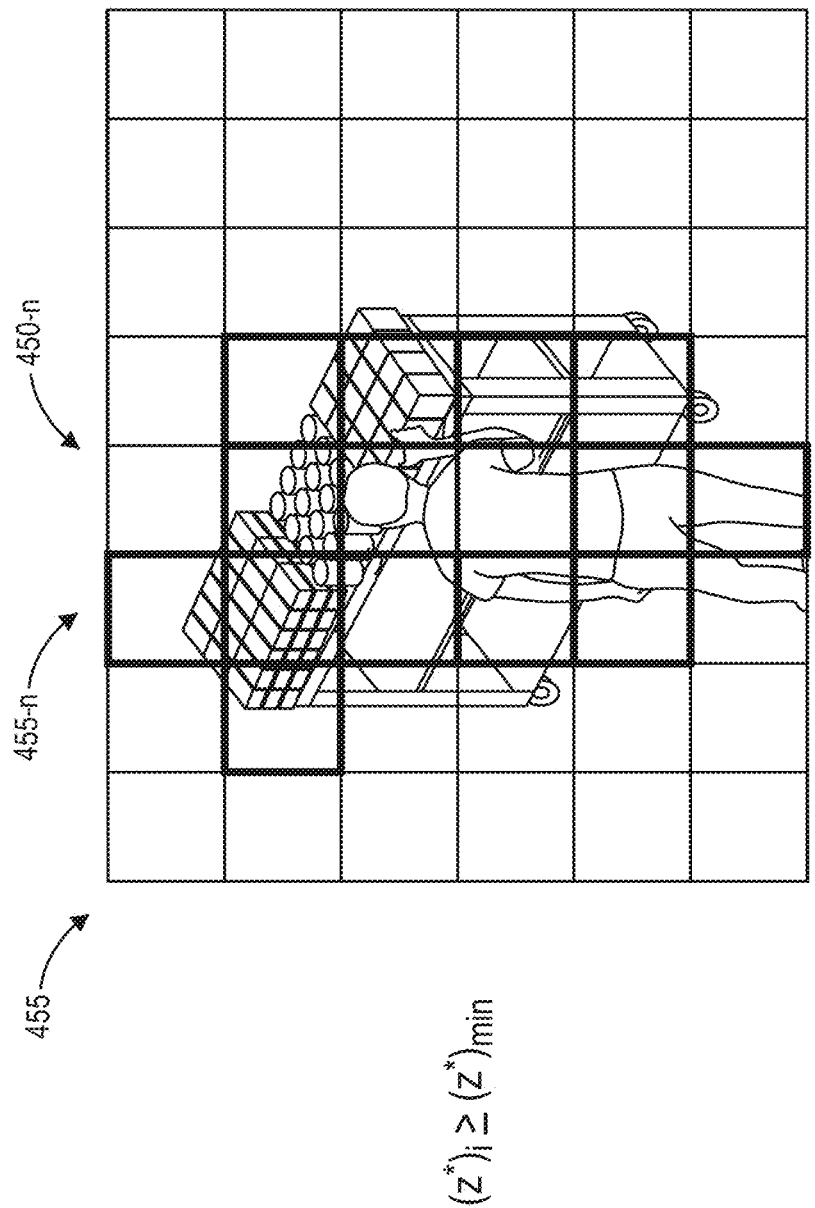

As is shown in FIG. 4D, a plurality of regions 455-$a$ of interest are identified. For example, in some implementations, the regions 455-$a$ may be a subset of the regions 455-$n$, and may be "high-confidence regions," having phase disparity values and confidence levels, or $(z^*)_i$, not less than a predetermined threshold, or $(z^*)_{MIN}$. In some other implementations, the regions 455-$a$ may be manually identified by one or more human operators or automatically selected by one or more algorithms, systems or techniques on any basis. For example, in some implementations, one or more of the regions 455-$a$ may be determined to include a portion of the inventory storage unit 460 or any number of items thereon. Alternatively, the regions 455-$a$ may be identified as being of interest in any other manner or on any other basis.

Figure 4E:
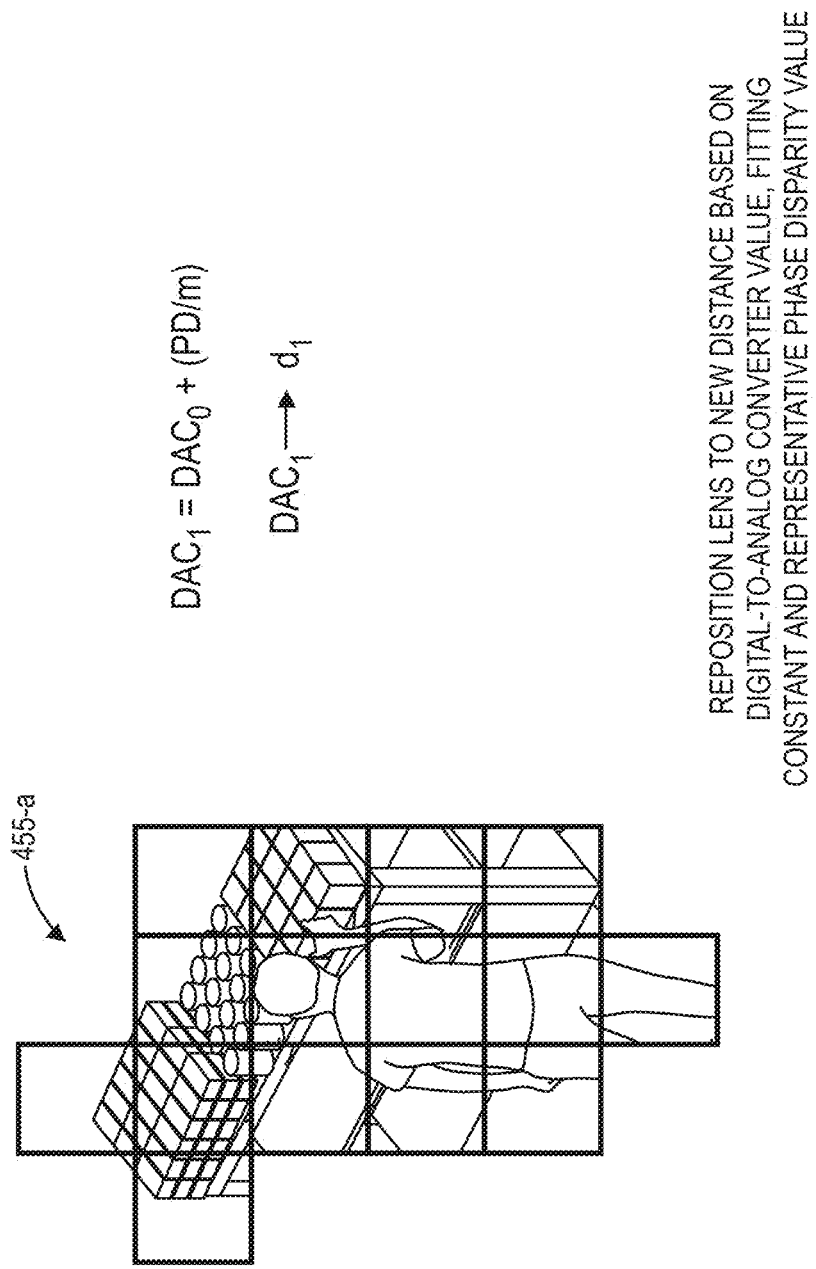

As is shown in FIG. 4E, a distance $d_i$ between a lens and an image sensor of the camera 410 is selected based on one or more digital-to-analog values predicted for the regions 455-*a* and a fitting constant, and the lens is repositioned to a position at the distance $d_1$ from the image sensor. For example, for each one of the regions 455-*a*, a digital-to-analog conversion value $DAC_1$ may be predicted based on a digital-to-analog conversion value $DAC_0$ corresponding to an initial distance $d_0$ between the lens and the image sensor, and a representative phase disparity determined for one or more of the regions 455-*a*, as well as a fitting constant m calculated for the camera 410. The lens may be repositioned to the distance $d_1$, e.g., by providing a current corresponding to the digital-to-analog conversion values $DAC_1$ to one or more motors.

Figure 5:
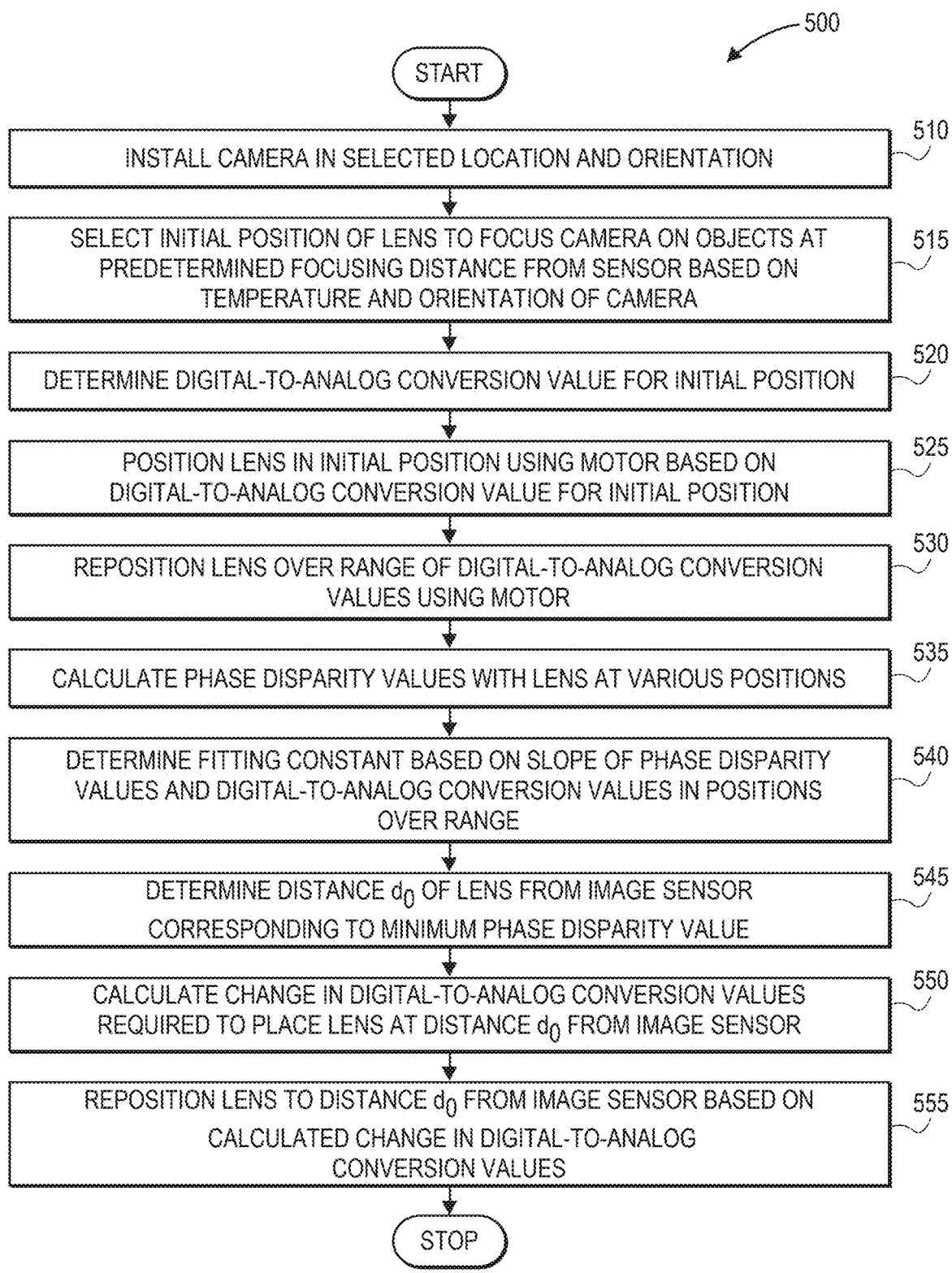
FIG. 5 is a flow chart of one process in accordance with implementations of the present disclosure.

Referring to FIG. 5, a flow chart 500 of one process in accordance with implementations of the present disclosure is shown. At box 510, a camera is installed in a selected location and orientation. In some implementations, the camera may be installed at an elevated location above one or more sets of shelves or traveling spaces within a materials handling facility, and oriented to include portions of such shelves or traveling spaces, as desired.

At box 515, an initial position of a lens of the camera is selected to focus the camera on objects at a predetermined focusing distance from the sensor based on a temperature or the orientation of the camera, or on any other factors. In some implementations, the initial position of the lens with respect to an image sensor of the camera, or a lens barrel including the lens, may be selected in order to cause objects that are located at a predetermined range or distance from the lens to appear in focus within images captured by the camera.

At box 520, a digital-to-analog conversion value is determined for the initial position selected at box 515. The digital-to-analog conversion value may correspond to a value required to place the lens at a predetermined distance from the image sensor of the camera, e.g., in the initial position, using one or more motors. At box 525, the lens is positioned in the initial position using a motor based on the digital-to-analog conversion value for the initial position.

At box 530, the lens is repositioned into a plurality of positions over a range of digital-to-analog conversion values using the motor. For example, the lens may be repositioned by increasing or decreasing currents supplied to the motor by a predetermined value or interval, corresponding to various digital-to-analog conversion values, as appropriate. The currents may be increased or decreased by constant amounts or step sizes, e.g., units of digital-to-analog converter values, such as twenty-five units.

At box 535, phase disparity values are calculated with the lens at the various positions over the range. For example, an image sensor of the camera may include a plurality of phase disparity pixel sensors distributed among other pixel sensors. Phase disparity values may be calculated based on using pixel sensors of the image sensor that are dedicated to respective regions of a field of view of the camera. In some implementations, phase disparity values may be calculated for discrete regions of a field of view of the camera, e.g., by dividing the field of view into cells or regions arranged in a grid or an array having any number of rows and columns, and calculating phase disparity values for each of such regions with the lens at various positions over the range. Such a grid or array may include any number of regions, such as twelve, forty-eight, one hundred ninety-two, or any other number of regions. In some other implementations, however, a single phase disparity value may be calculated for the field of view at each of such positions over the range. Additionally, phase disparity values and their respective confidence levels may be calculated based on data received by the phase disparity sensors at the same times that images are captured by the camera, or at different times. In some implementations, phase disparity values may be calculated by the camera without capturing any images.

At box 540, a fitting constant is determined based on a slope of the phase disparity values plotted against the digital-to-analog conversion values with the lens in the various positions over the range. For example, the fitting constant may be a slope of a line of best fit between phase disparity values calculated with the lens at various distances from the image sensor, and digital-to-analog conversion values corresponding to the respective distances, or any other relationship between the phase disparity values and the digital-to-analog conversion values corresponding to the respective distances.

At box 545, a distance $d_0$ of the lens from an image sensor corresponding to a minimum phase disparity value is determined, e.g., based on the fitting constant. At box 550, a change in digital-to-analog conversion values required to place the lens in a position at the position do from the image sensor is calculated.

At box 555, the lens is repositioned to the position at the distance $d_0$ from the image sensor corresponding to the minimum phase disparity value based on the change in digital-to-analog conversion values calculated at box 550, and the process ends. For example, a current corresponding to the change in digital-to-analog conversion values or a difference in the digital-to-analog conversion values may be supplied to a motor coupled to a lens barrel or another structure including the lens, and the lens barrel may be repositioned in response to the current.

Figure 6A:
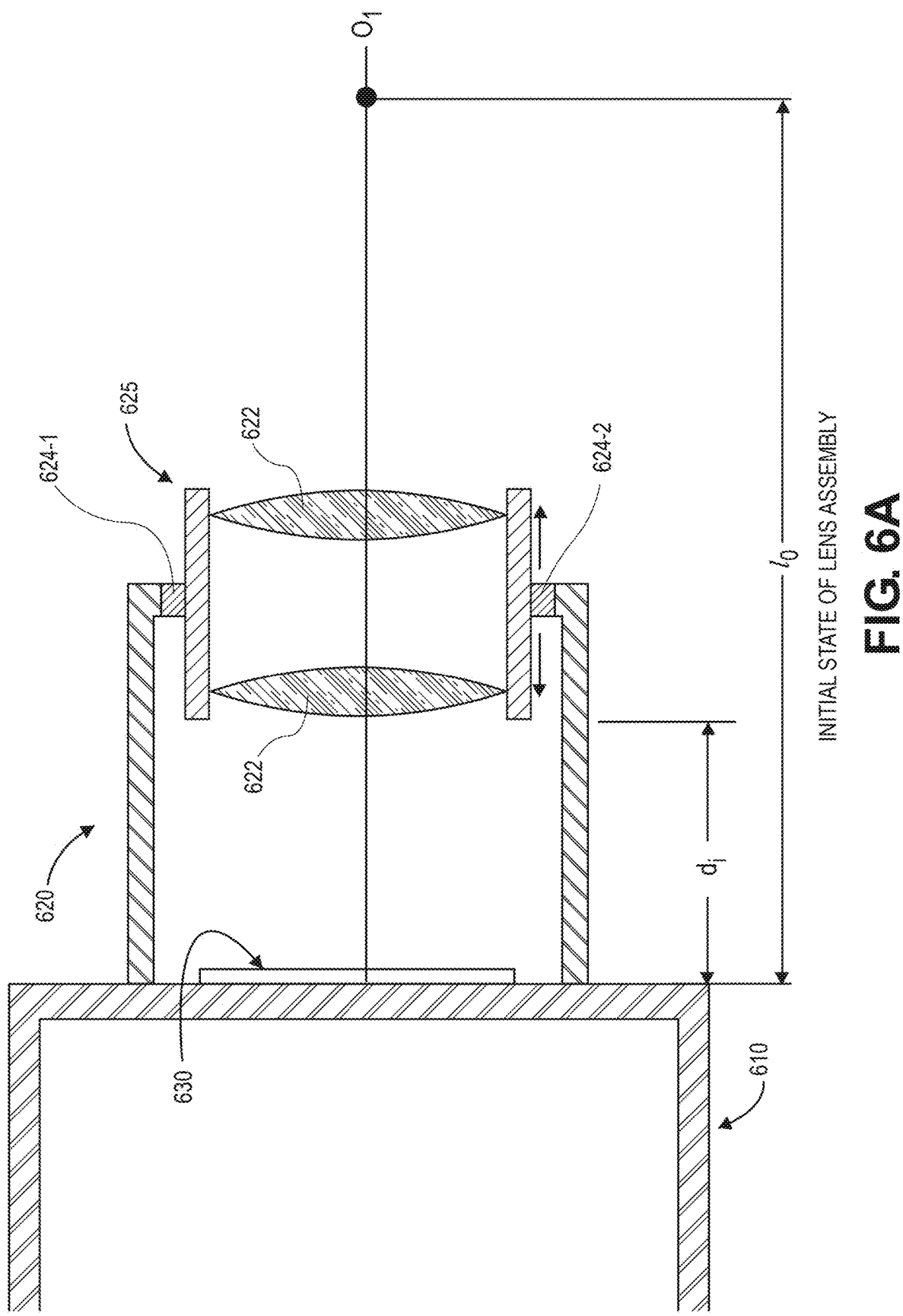
FIGS. 6A and 6B are views of aspects of one system in accordance with implementations of the present disclosure.
Figure 6B:
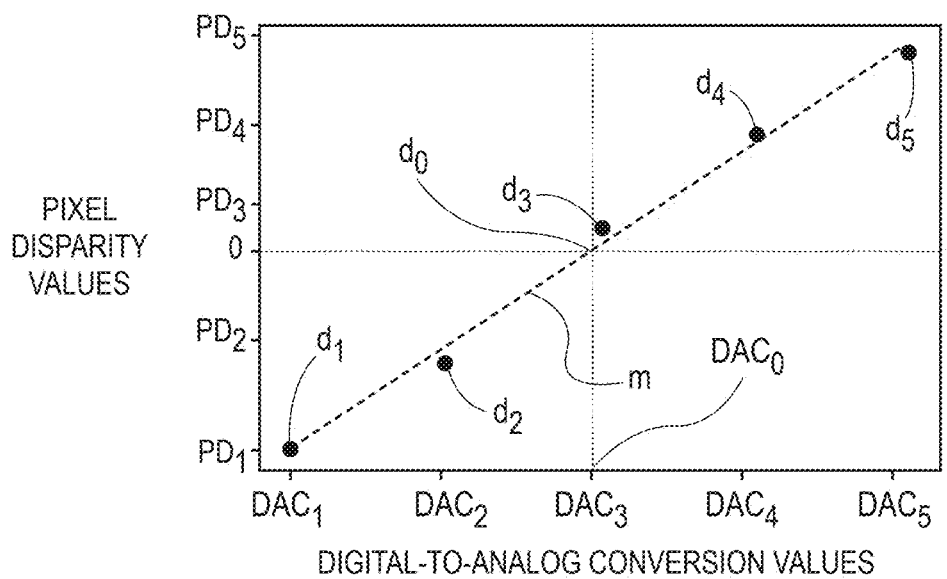

Referring to FIGS. 6A and 6B, views of aspects of one system in accordance with implementations of the present disclosure are shown. Except where otherwise noted, reference numerals preceded by the number "6" shown in FIGS. 6A and 6B indicate components or features that are similar to components or features having reference numerals preceded by the number "4" shown in FIGS. 4A through 4E, by the number "2" shown in FIG. 2 or by the number "1" shown in FIGS. 1A through 1G.

As is shown in FIG. 6A, a camera 610 includes a lens assembly 620 mounted to the camera 610 and an image sensor 630. The lens assembly 620 includes a pair of lenses 622 that are provided within a lens barrel 625 and at least two motors 624-1, 624-2 (e.g., servos or voice coil motors) that are coupled to the lens barrel 625, or otherwise configured to move or translate the lens barrel 625 and the lenses 622 in one or more directions in a direction along or parallel to an optical axis O. Alternatively, or additionally, the lens assembly 620 may include any number of other lenses.

By providing currents corresponding to digital-to-analog converter values to the motors 624-1, 624-2, a nearest one of the lenses 622 of the lens assembly 620 may be placed at a variety of distances $d_i$ from the image sensor 630. In some implementations, the image sensor 630 may be a complementary metal oxide semiconductor (or "CMOS") image sensor or component thereof, a charge-coupled device (or "CCD") image sensor or component thereof, or any other type or form of image sensor or component thereof having a plurality of pixel sensors as well as amplifiers, switches, gates or any other relevant components for controlling exposure of the image sensor 630 to light and the conversion of charges or analog signals associated with such exposure to digital signals. The image sensor 630 may further include a plurality of pixel sensors for determining phase disparities that are embedded with other pixel sensors, e.g., visual pixel sensors or depth pixel sensors. For example, the image sensor 630 may include left phase disparity pixel sensors and right phase disparity pixel sensors within an active pixel area, in any concentration or density. In some implementations, the image sensor 630 may include pairs of left phase disparity pixel sensors and right phase disparity pixel sensors distributed within an array of visual pixel sensors, such as four pairs of left phase disparity pixel sensors and right phase disparity pixel sensors within a square array of eight pixel sensors by eight pixel sensors in size, or four pairs of left phase disparity pixel sensors and right phase disparity pixel sensors within a square array of sixteen pixel sensors by sixteen pixel sensors in size.

The distances $d_i$ between a nearest lens 622 and the image sensor 630 may be selected on any basis and for any reason. For example, in some implementations, a distance $d_i$ between a lens 622 and the image sensor 630 may be selected in order to cause objects provided at a point P at predetermined range $l_0$ from the nearest lens 622, such as one to two meters, along an optical axis O to appear within focus when depicted within images captured using the camera 610.

In accordance with implementations of the present disclosure, a fitting constant for the camera 610 may be calculated by varying the distances $d_i$ between a nearest one of the lenses 622 and the image sensor 630, and determining phase disparity values for regions of a field of view of the camera 610 with the nearest lens 622 at the varying distances $d_i$. As is shown in FIG. 6B, a plot of pixel disparity values to digital-to-analog conversion values is shown. The pixel disparity values, or $PD_1$, $PD_2$, $PD_3$, $PD_4$, $PD_5$, were determined with the nearest lens 622 at a plurality of distances and are plotted against digital-to-analog conversion values $DAC_1$, $DAC_2$, $DAC_3$, $DAC_4$, $DAC_5$ corresponding to each of such distances. For example, in some implementations, the lens 622 may be repositioned to the various distances by increasing or decreasing currents supplied to a motor coupled to the lens barrel 625 by values corresponding to digital-to-analog conversion values $DAC_1$, $DAC_2$, $DAC_3$, $DAC_4$, $DAC_5$, which may be separated by a fixed digital-to-analog conversion interval $\Delta DAC$, and determining the pixel disparity values, or $PD_1$, $PD_2$, $PD_3$, $PD_4$, $PD_5$, with the lens 622 at such distances. The fitting constant m may be calculated as a slope of a line of best fit or another relationship between the pixel disparity values, or $PD_1$, $PD_2$, $PD_3$, $PD_4$, $PD_5$, and the digital-to-analog conversion values $DAC_1$, $DAC_2$, $DAC_3$, $DAC_4$, $DAC_5$ corresponding to the distances $d_1$, $d_2$, $d_3$, $d_4$, $d_5$.

Once the pixel disparity values $PD_1$, $PD_2$, $PD_3$, $PD_4$, $PD_5$ have been plotted against the digital-to-analog conversion values $DAC_1$, $DAC_2$, $DAC_3$, $DAC_4$, $DAC_5$, and the fitting constant m has been calculated, a digital-to-analog conversion value $DAC_0$ corresponding to a minimum phase disparity may be identified. A current corresponding to the $DAC_0$ may be provided to the motors 624-1, 624-2 to cause the lens barrel 625 to be placed at a distance that causes the phase disparity to be minimized, and causes objects depicted within images captured by the camera 610 to appear in focus.

The camera systems of the present disclosure may include camera modules that are provided in housings and configured for mounting to ceilings or other structures that are positioned above areas of interest, such as above one or more areas of a retail establishment or another materials handling facility. The camera systems of the present disclosure may have any shapes or sizes, and may include any number of camera modules aligned to capture imaging data in multiple directions and around entire perimeters of the camera systems. Imaging data captured by the camera systems may be utilized for any purpose.

Although some of the implementations disclosed herein reference the use of the camera systems of the present disclosure in materials handling facilities or like environments, those of ordinary skill in the pertinent arts will recognize that the systems and methods disclosed herein are not so limited, and may be utilized in connection with cameras that are provided for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 3 or 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A camera system comprising:
   a housing;
   one or more processor units disposed within the housing;
   at least one memory component disposed within the housing;
   an image sensor comprising a plurality of pixel sensors distributed in an array,
   wherein at least some of the plurality of pixel sensors are phase disparity pixel sensors;
   a lens; and
   at least one motor configured to position the lens with respect to the image sensor,
   wherein the camera system is programmed with one or more sets of instructions that, when executed by the one or more processor units, cause the camera system to execute a method comprising:
   selecting a first position with respect to the image sensor, wherein the first position corresponds to a first digital-to-analog conversion value for the at least one motor;
   causing the lens to be placed in the first position by the at least one motor;
   determining at least a first set of phase disparity values for each of a plurality of portions of a field of view of the camera system with the lens in the first position;
   determining a representative phase disparity value based at least in part on at least some of the first set of phase disparity values;
   selecting a second digital-to-analog conversion value, wherein the second digital-to-analog conversion value corresponds to the representative phase disparity value; and
   causing the lens to be placed in a second position by the at least one motor based at least in part on the second digital-to-analog conversion value.

2. The camera system of claim 1, wherein determining at least the first set of phase disparity values comprises:
   determining a second set of phase disparity values, wherein each of the first set of phase disparity values is one of the second set of phase disparity values;
   calculating a plurality of confidence levels, wherein each of the plurality of confidence levels is calculated for one of the second set of phase disparity values; and
   determining that a subset of the plurality of confidence levels exceeds a predetermined threshold,
   wherein the first set of phase disparity values comprises the ones of the second set of phase disparity values for which each of the subset of the plurality of confidence levels was calculated.

3. The camera system of claim 1, wherein the method further comprises:
   causing the lens to be placed in each of a plurality of positions with respect to the image sensor, wherein each one of the plurality of positions is associated with one of a plurality of digital-to-analog conversion values;
   determining a plurality of sets of phase disparity values for each of the plurality of portions of the field of view of the camera system, wherein each of the plurality of sets of phase disparity values is determined with the lens in one of the plurality of positions with respect to the image sensor;
   calculating medians of each of the plurality of sets of phase disparity values; and
   determining a relationship between the medians of each of the plurality of sets of phase disparity values and the plurality of digital-to-analog conversion values,
   wherein the relationship is a fitting constant.

4. The camera system of claim 1, wherein the method further comprises:
   determining that a triggering event has occurred,
   wherein at least the first set of phase disparity values is determined for each of the plurality of portions of the field of view of the camera system in response to determining that the triggering event has occurred, and
   wherein the triggering event comprises at least one of:
   a change in temperature;
   an elapsed time;
   a change in orientation of the camera system; or
   a request from a human.

5. The camera system of claim 1, wherein the motor is a voice coil motor.

6. A method comprising:
   calculating at least a first plurality of phase disparity values for a camera at a first time, wherein each one of the first plurality of phase disparity values corresponds to one of a plurality of portions of a field of view of the camera at the first time, and wherein a first lens of the camera is provided at a first distance from an image sensor of the camera at the first time;
   selecting a representative phase disparity value based at least in part on at least some of the first plurality of phase disparity values;
   determining a first current to be supplied to a motor based at least in part on the representative phase disparity value and a fitting constant calculated for the camera, wherein the first current corresponds to a phase disparity value of approximately zero for the camera; and
   supplying the first current to the motor at a second time, wherein supplying the first current to the motor causes the first lens to be placed at a second distance from the image sensor.

7. The method of claim 6, wherein the representative phase disparity value is one of:
   a central tendency of the first plurality of phase disparity values;
   a mean of the first plurality of phase disparity values;
   a median of the first plurality of phase disparity values;
   a mode of the first plurality of phase disparity values; or
   a value greater than a predetermined percentage of the first plurality of phase disparity values.

8. The method of claim 6, wherein the image sensor comprises a plurality of phase disparity pixel sensors distributed among a plurality of visual pixel sensors, and
   wherein each one of the plurality of phase disparity pixel sensors corresponds to one of the portions of the field of view of the camera.

9. The method of claim 6, wherein calculating at least the first plurality of phase disparity values comprises:

calculating a second plurality of phase disparity values for the camera at the first time, wherein each one of the first plurality of phase disparity values is one of the second plurality of phase disparity values;

calculating a plurality of confidence levels, wherein each one of the plurality of confidence levels relates to one of the second plurality of phase disparity values; and determining that a subset of the plurality of confidence levels exceed a predetermined threshold, wherein each one of the subset of the plurality of confidence levels relates to one of the first plurality of phase disparity values.

10. The method of claim 6, wherein the fitting constant is a slope of a line of best fit of a plot between phase disparity values calculated with the first lens at a plurality of distances from the image sensor prior to the first time and digital-to-analog conversion values corresponding to each of the plurality of distances.

11. The method of claim 6, further comprising:

prior to the first time, causing the first lens to be placed at each of a plurality of distances from the image sensor, wherein each one of the plurality of distances is associated with one of a plurality of digital-to-analog conversion values;

determining a plurality of sets of phase disparity values for each of the plurality of portions of the field of view of the camera, wherein each of the plurality of sets of phase disparity values is determined with the first lens at one of the plurality of distances from the image sensor;

statistically aggregating each of the plurality of sets of phase disparity values; and determining a relationship between representative phase disparity values of each one of the plurality of sets of phase disparity values and ones of the plurality of digital-to-analog conversion values, wherein the fitting constant is the relationship.

12. The method of claim 6, wherein each of the plurality of portions of the field of view of the camera is arranged in a grid having eight columns and six rows.

13. The method of claim 6, wherein the camera is mounted to one of a ceiling of a materials handling facility or a wall of the materials handling facility, or wherein the camera is mounted over at least one of a shelving unit or a traveling surface of the materials handling facility.

14. The method of claim 6, further comprising:

determining that a triggering event has occurred, wherein at least the first plurality of phase disparity values is calculated for each of the plurality of portions of the field of view of the camera in response to determining that the triggering event has occurred, and wherein the triggering event comprises at least one of:

a change in temperature between a second time and the first time, wherein the second time precedes the first time;

an elapsed time since the second time;

a change in orientation of the camera since the second time; or a request of a human.

15. The method of claim 6, wherein the first distance is selected to cause objects provided at a third distance from the image sensor to be in focus, and wherein the method further comprises:

prior to the first time, determining a second current to be supplied to the motor, wherein the second current corresponds to the first distance; and supplying the second current to the motor at a third time, wherein the third time precedes the first time, and wherein supplying the second current to the motor causes the first lens to be placed at the first distance from the image sensor.

16. The method of claim 15, wherein the motor is a voice coil motor.

17. A camera system comprising:

a housing;

one or more processor units disposed within the housing;

at least one memory component disposed within the housing;

an image sensor comprising a plurality of pixel sensors distributed in an array, wherein at least some of the plurality of pixel sensors are phase disparity pixel sensors;

a lens; and at least one motor configured to position the lens with respect to the image sensor, wherein the camera system is programmed with one or more sets of instructions that, when executed by the one or more processor units, cause the camera system to execute a method comprising:

causing the lens to be placed at a plurality of distances from the image sensor by the at least one motor, wherein each of the plurality of distances corresponds to one of a plurality of digital-to-analog conversion values provided to the at least one motor;

determining a plurality of sets of phase disparity values, wherein the phase disparity values of each of the sets correspond to one of a plurality of regions of a field of view of the camera system, and wherein each of the sets of phase disparity values is determined with the lens at one of the plurality of distances from the image sensor;

calculating representative phase disparity values, wherein each one of the representative phase disparity values is calculated for one of the plurality of sets of phase disparity values determined with the lens at one of the plurality of distances from the image sensor;

selecting a digital-to-analog conversion value corresponding to a minimum phase disparity value based at least in part on a line of best fit between the representative phase disparity values and the plurality of digital-to-analog conversion values corresponding to the plurality of distances;

causing the lens to be placed at a first distance from the image sensor based at least in part on the selected digital-to-analog conversion value corresponding to the minimum phase disparity value;

determining a set of phase disparity values, wherein each of the phase disparity values corresponds to one of the plurality of regions of the field of view of the camera system, and wherein the set of phase disparity values is determined with the lens at the first distance from the image sensor;

calculating a representative one of the phase disparity values determined for each one of the plurality of regions of the field of view of the camera system with the lens at the first distance from the image sensor;

selecting a digital-to-analog conversion value based at least in part on the representative one of the phase disparity values; and causing the lens to be placed at a second distance from the image sensor based at least in part on the digital-to-analog conversion value selected based at least in part on the representative one of the phase disparity values.

18. The camera system of claim 17, wherein each of the plurality of regions of the field of view of the camera system is arranged in a grid having eight columns and six rows.

19. The camera system of claim 17, further comprising a voice coil motor coupled to the lens, wherein causing the lens to be placed at the first distance from the image sensor comprises:
providing a current corresponding to the selected digital-to-analog conversion value corresponding to the minimum phase disparity value to the voice coil motor, and wherein causing the lens to be placed at the second distance from the image sensor comprises:
providing a current corresponding to the digital-to-analog conversion value selected based at least in part on the representative one of the phase disparity values to the voice coil motor.

20. The camera system of claim 17, wherein the camera system is mounted to one of a ceiling of a materials handling facility or a wall of the materials handling facility, or wherein the camera system is mounted over at least one of a shelving unit or a traveling surface of the materials handling facility.

\* \* \* \* \*